Dec. 1, 1953

W. T. POWELL 2,661,396

LINE FINDER WITH DIFFERENTIAL TEST RELAY

Original Filed July 10, 1947

12 Sheets-Sheet 1

INVENTOR.
WINFRED T. POWELL
BY
Winfred T. Powell
ATTORNEY

INVENTOR.
WINFRED T. POWELL
BY
Winfred T. Powell
ATTORNEY

Dec. 1, 1953    W. T. POWELL    2,661,396
LINE FINDER WITH DIFFERENTIAL TEST RELAY
Original Filed July 10, 1947    12 Sheets-Sheet 4

Figure 1:
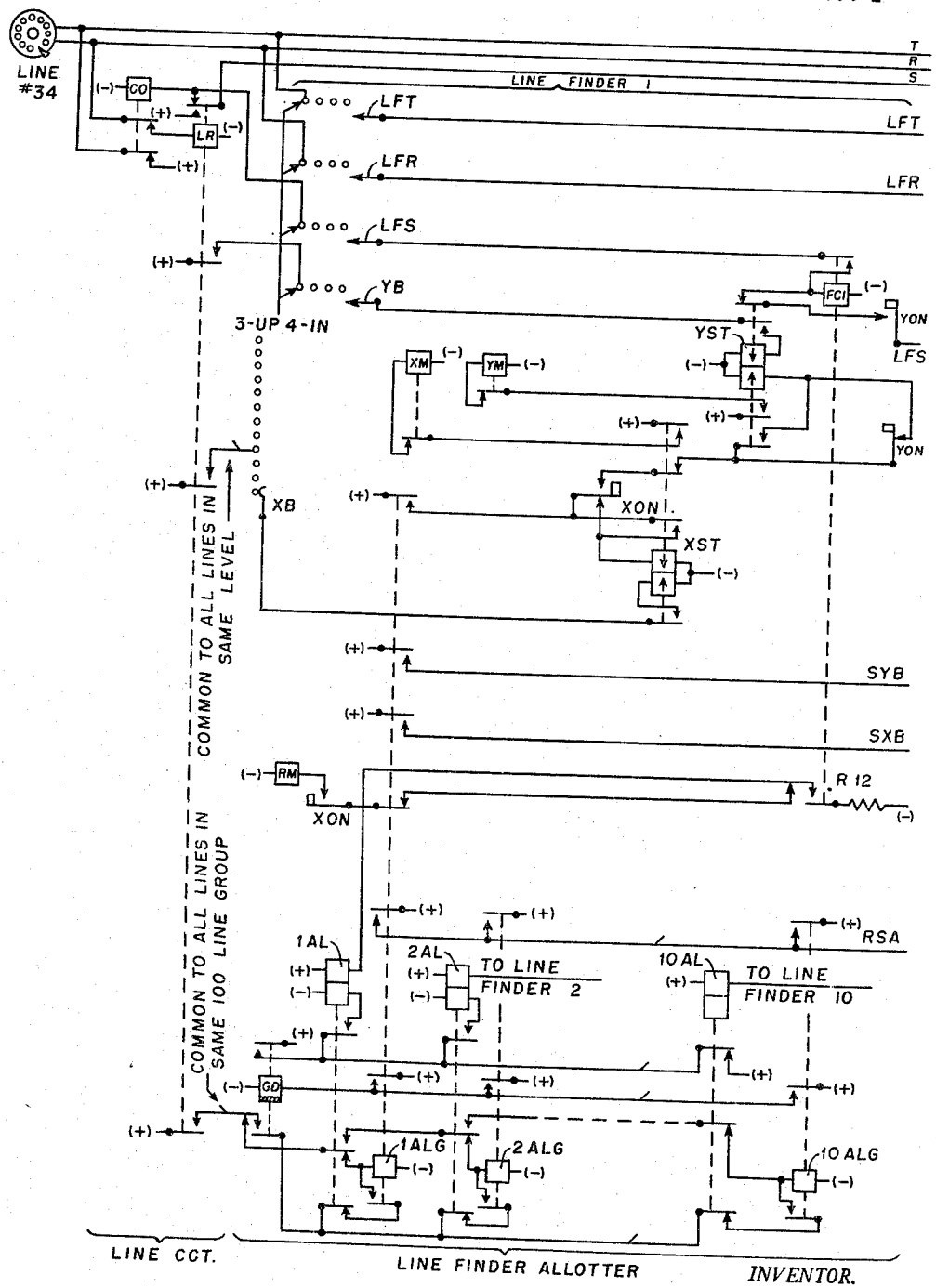
Figure 2:
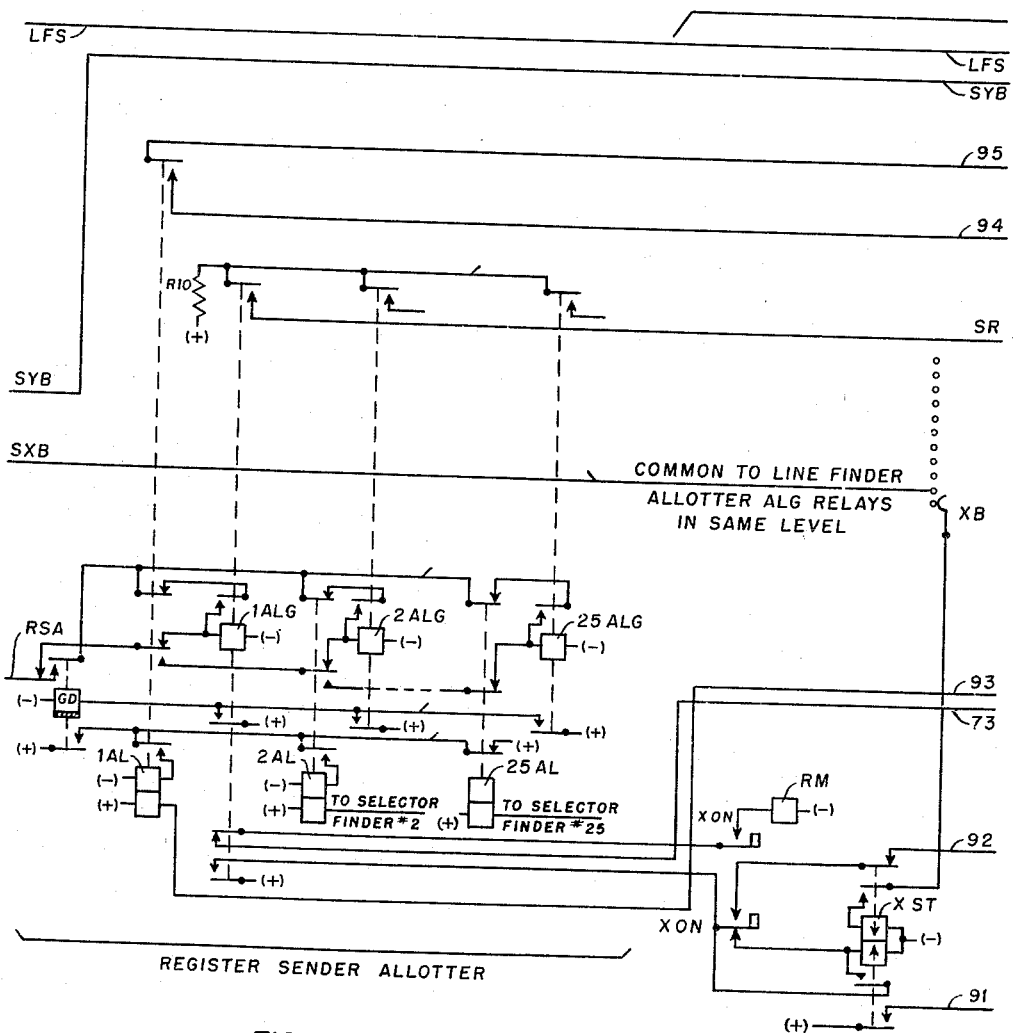
Figure 3:
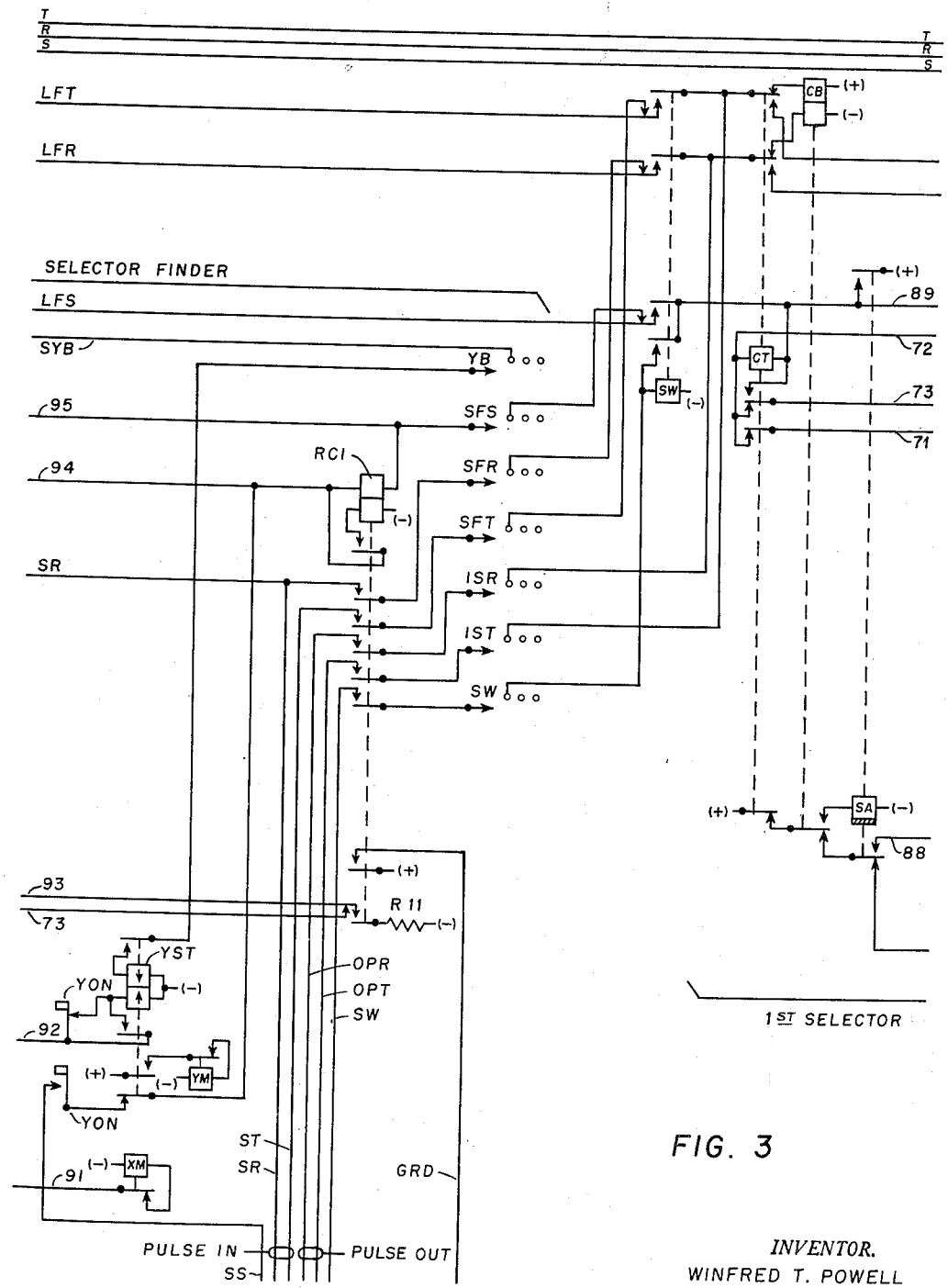
Figure 4:
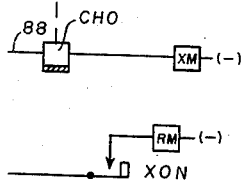
Figure 5:
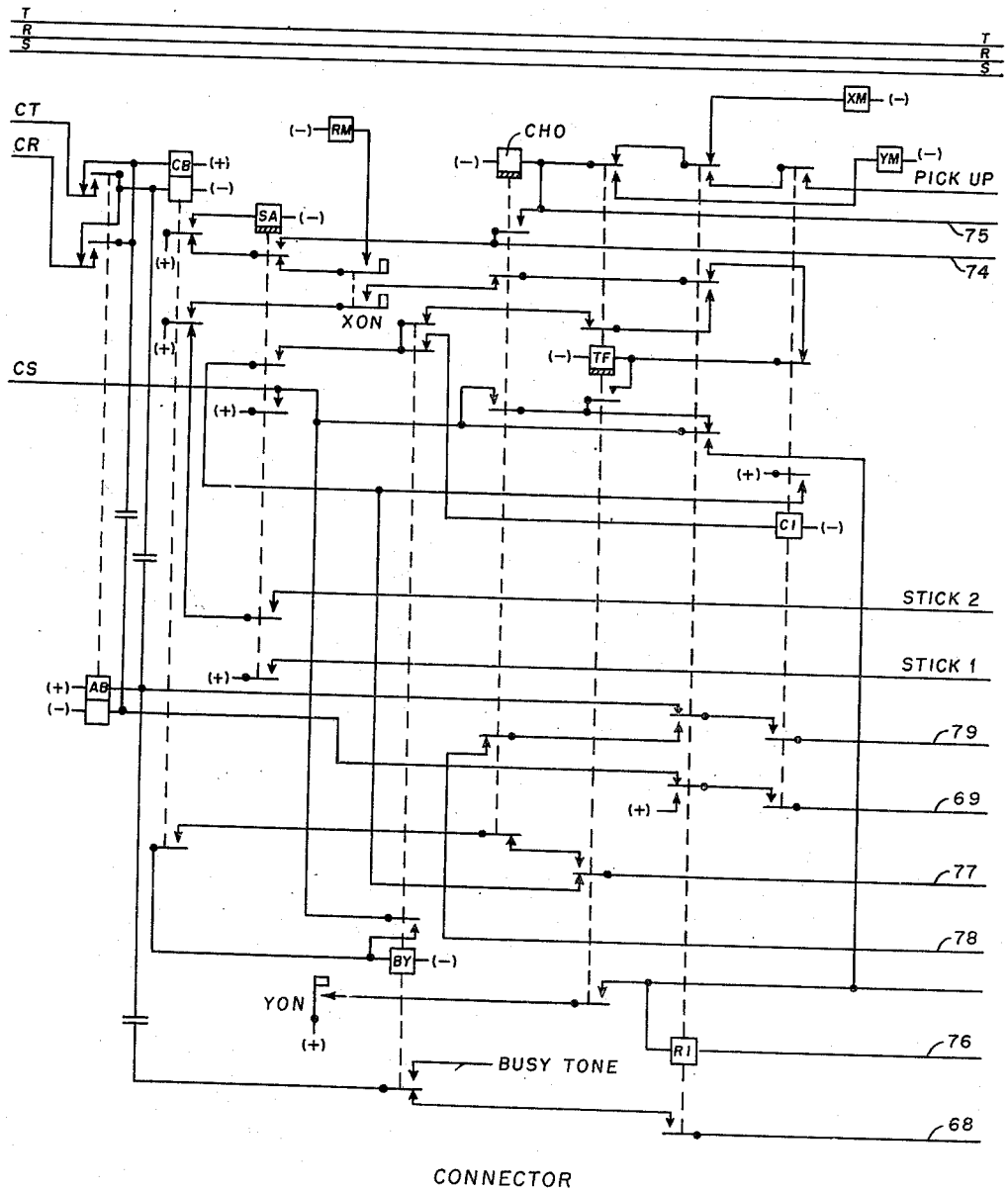
Figure 6:
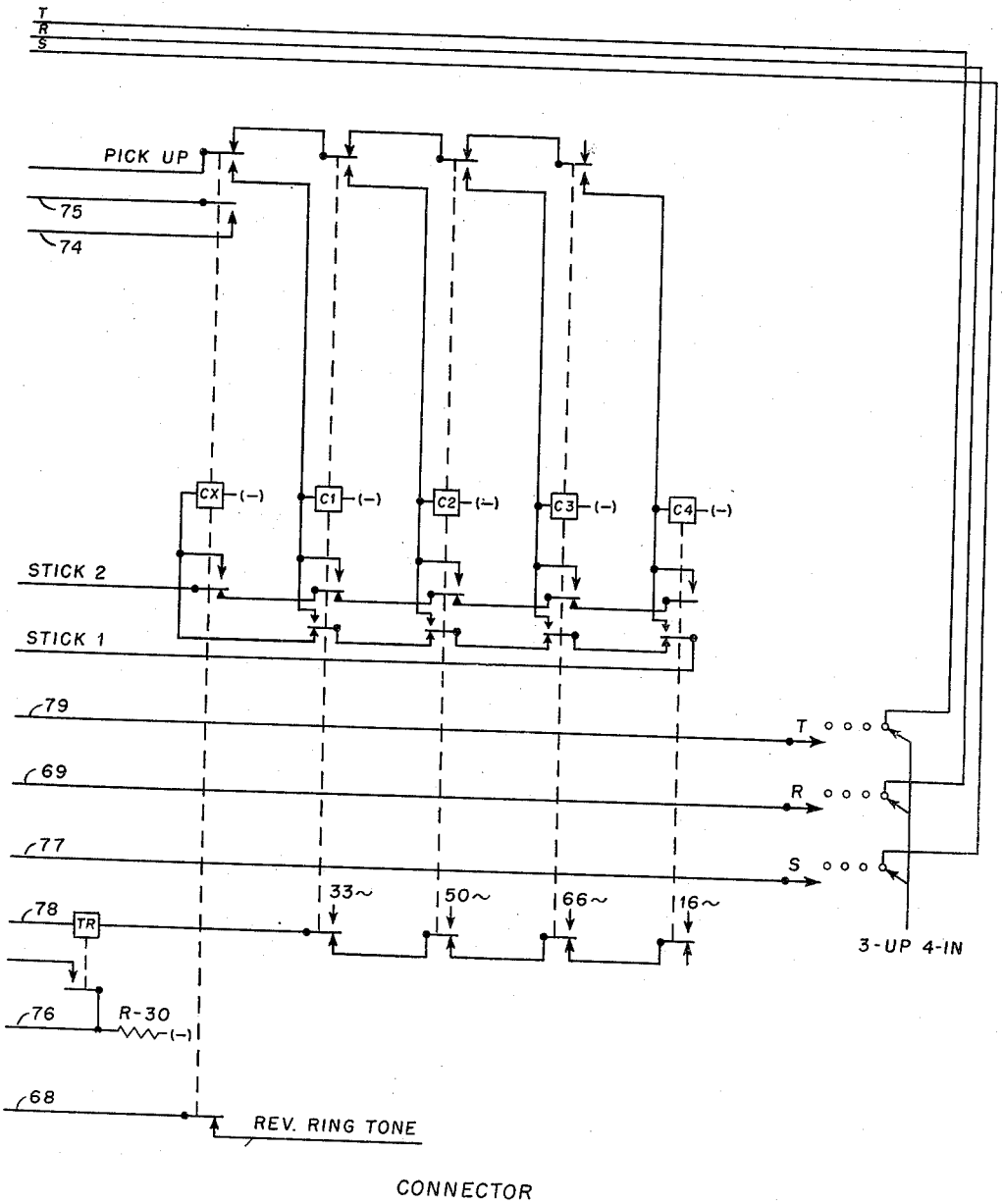
Figure 7:
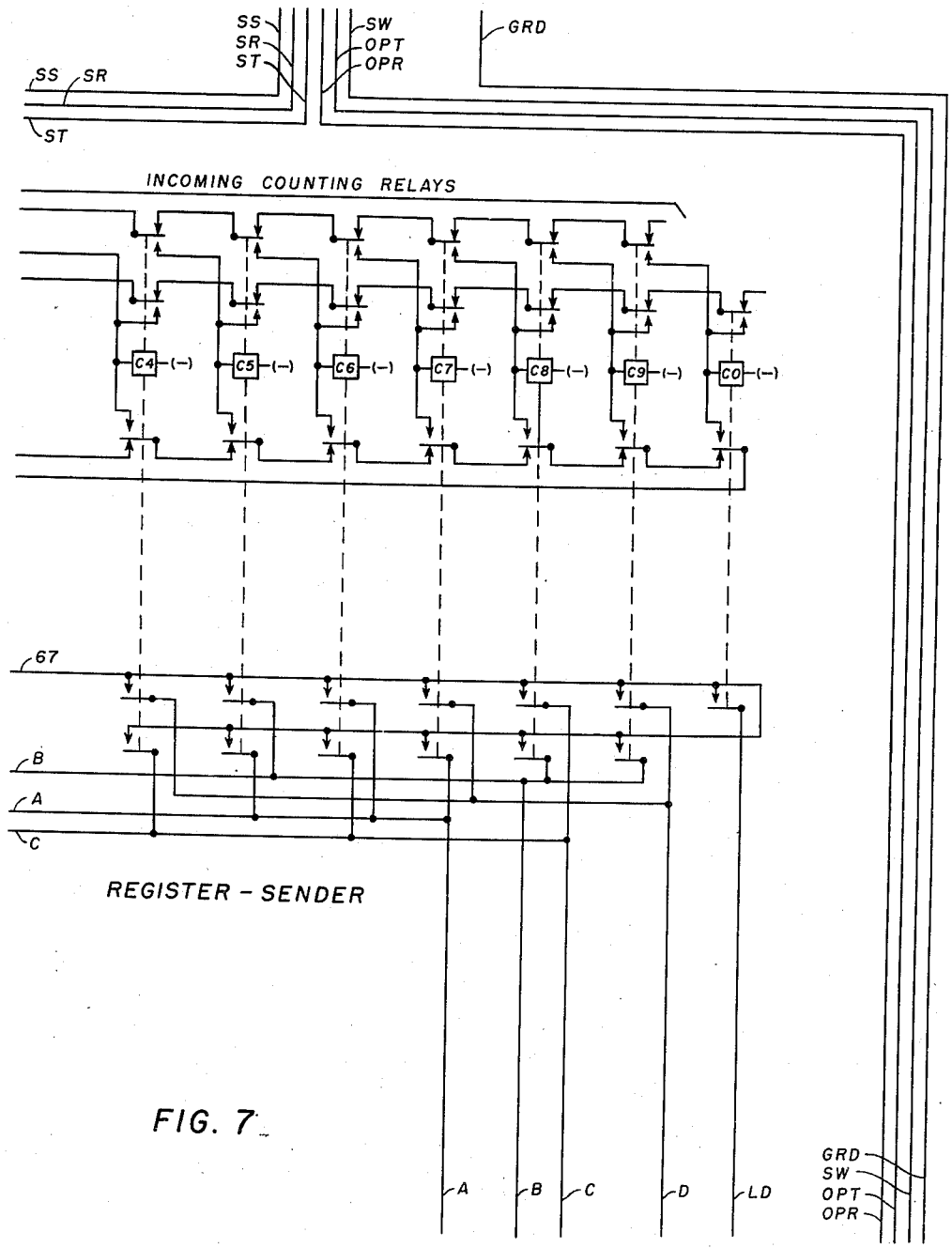
Figure 8:
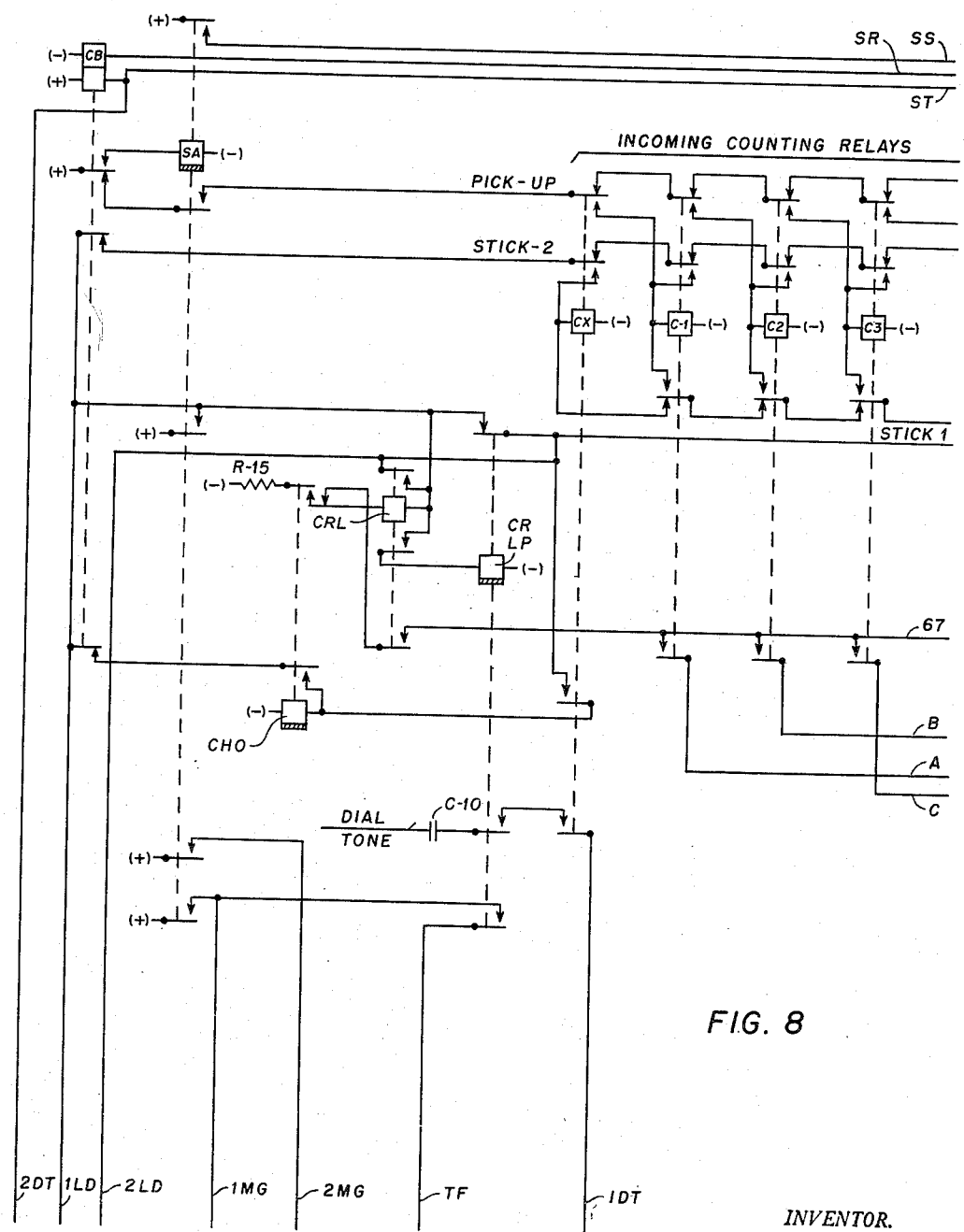
Figure 9:
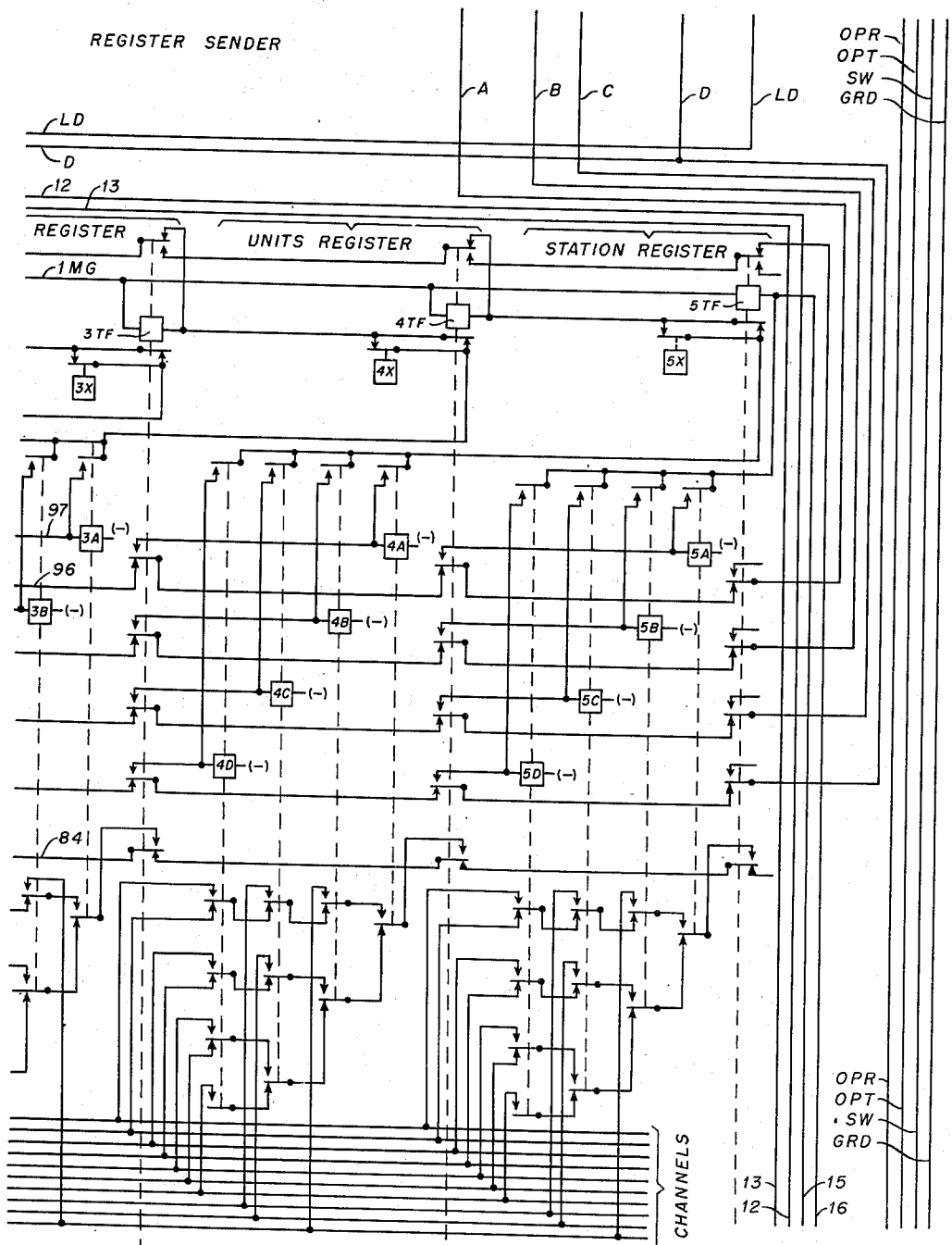
Figure 10:
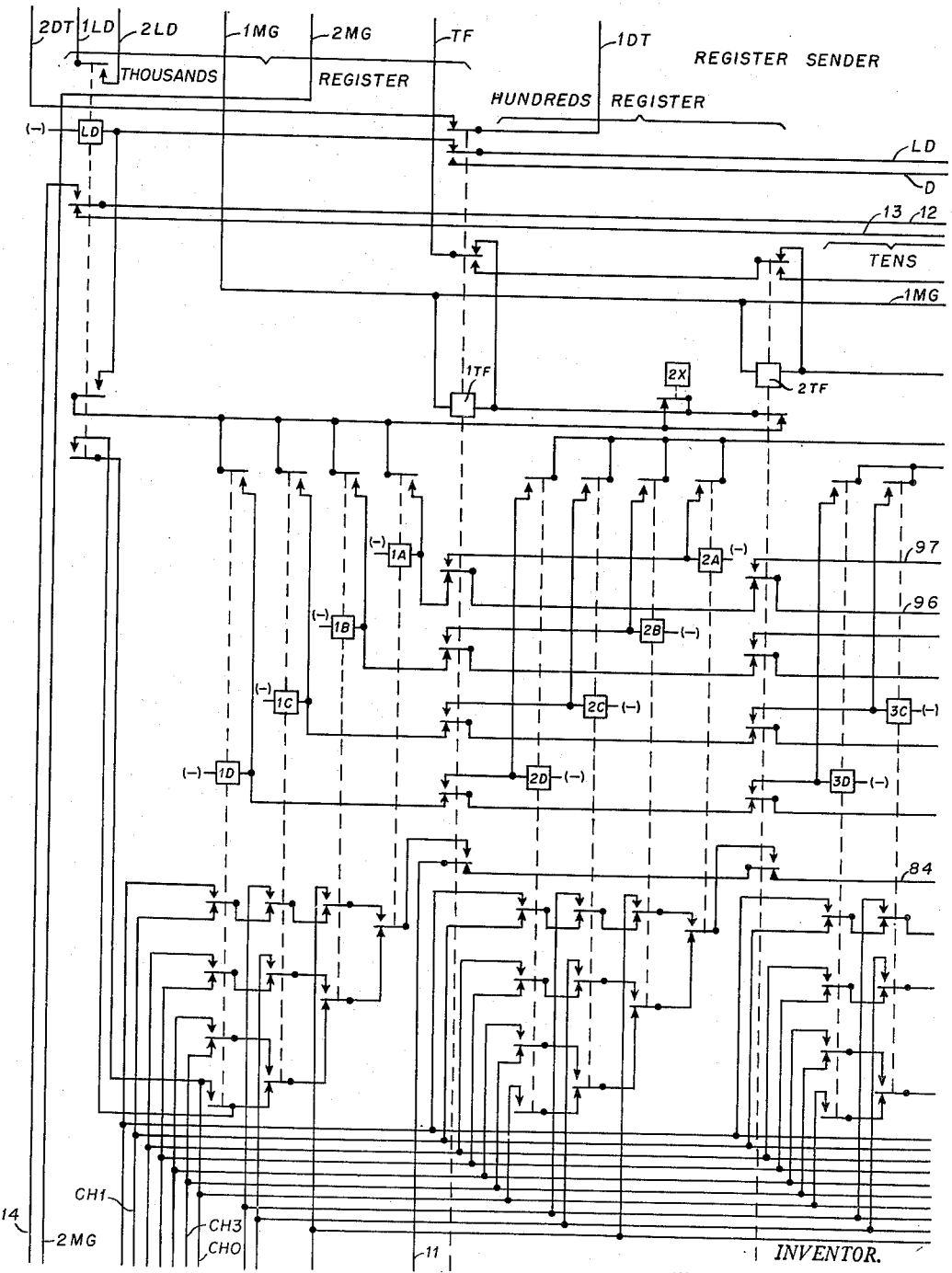
Figure 11:
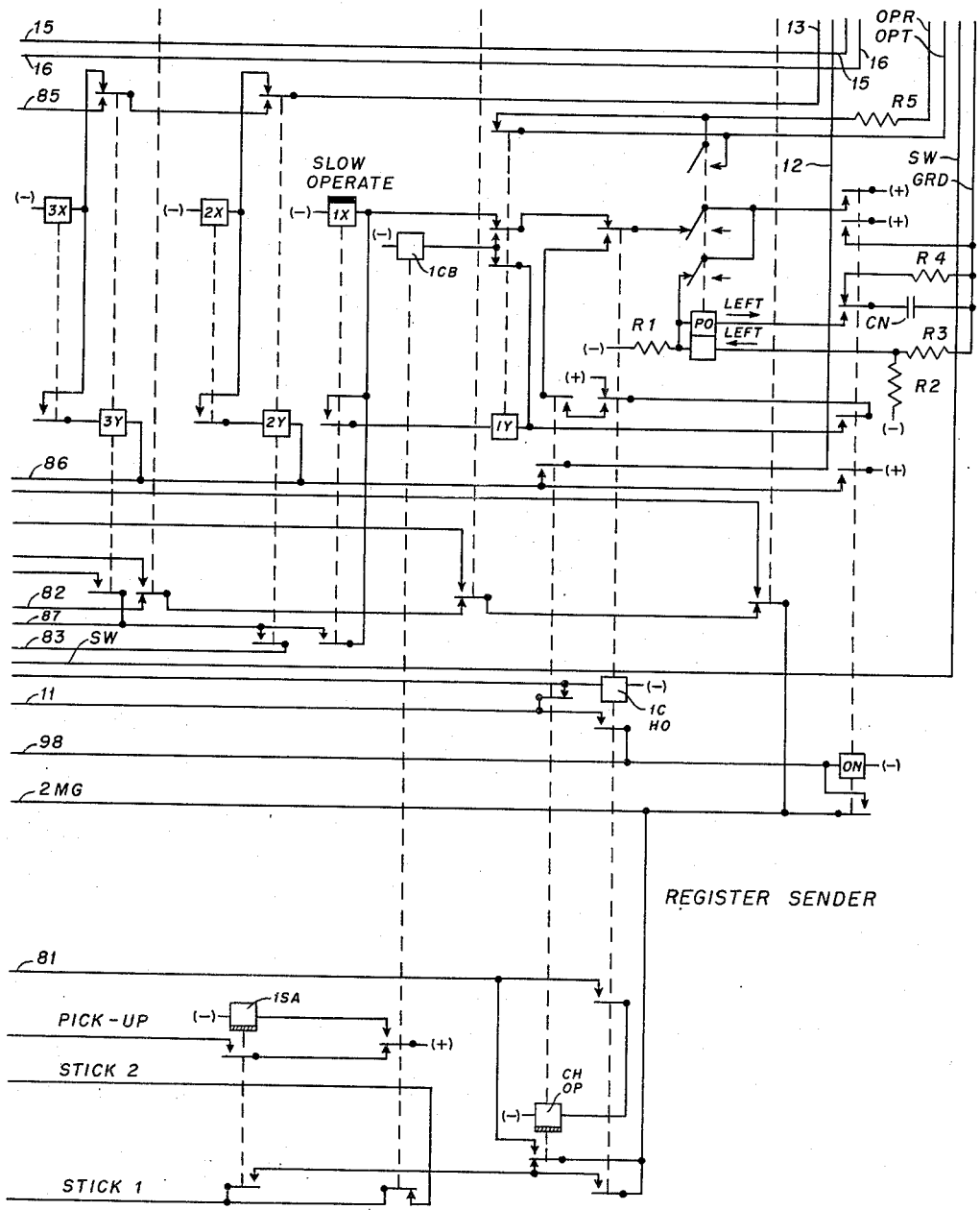
Figure 12:
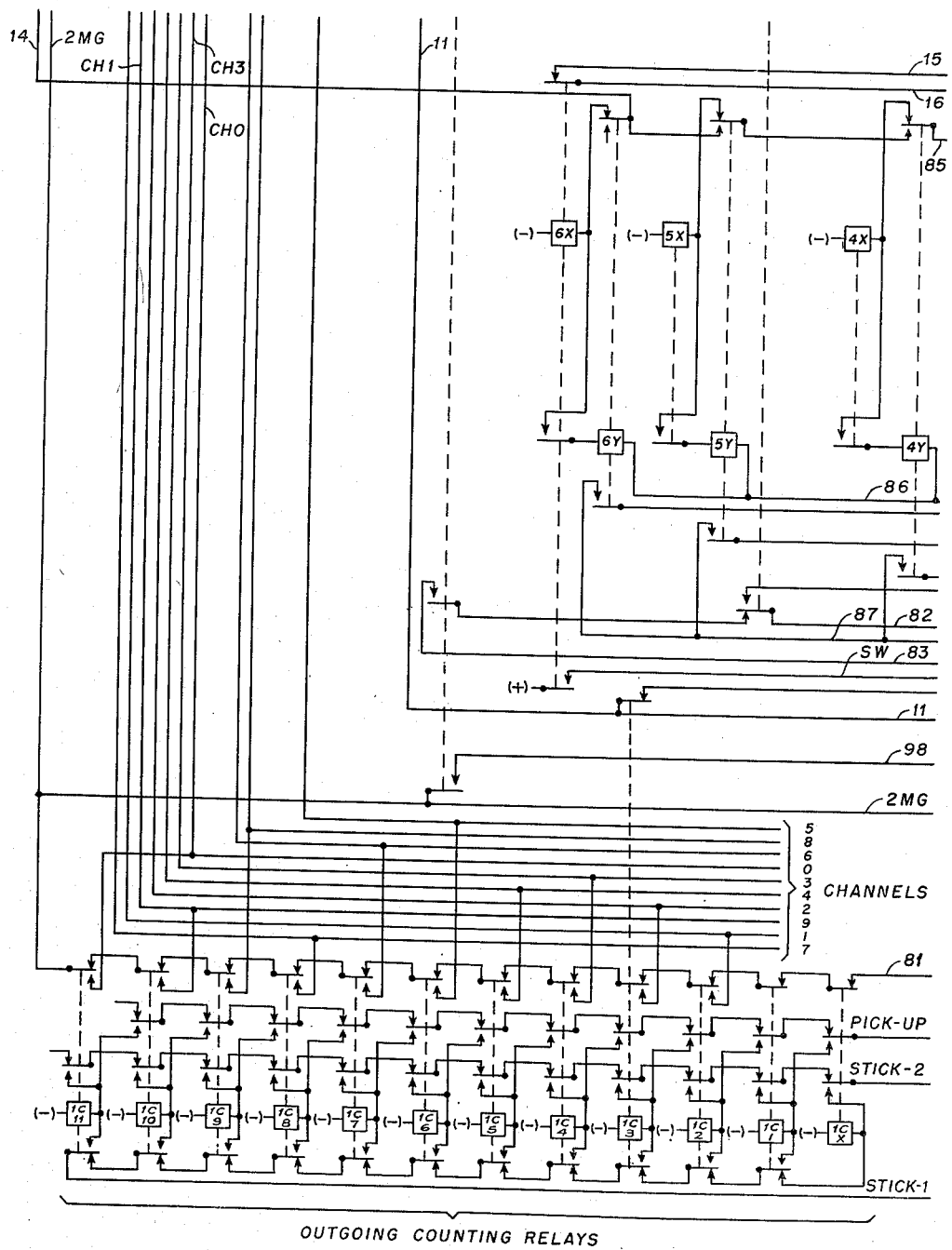

| FIG. 1 | FIG. 2 | FIG. 3 | FIG. 4 | FIG. 5 | FIG. 6 |
|--------|--------|--------|--------|--------|--------|
|        | FIG. 8 | FIG. 7 |        |        |        |
|        | FIG. 10| FIG. 9 |        |        |        |
|        | FIG. 12| FIG. 11|        |        |        |

1ST SELECTOR

INVENTOR.
WINFRED T. POWELL
BY
*Winfred T. Powell*
ATTORNEY

INVENTOR.
WINFRED T. POWELL

INVENTOR.
WINFRED T. POWELL
BY
Winfred T. Powell
ATTORNEY

INVENTOR.
WINFRED T. POWELL
BY
Winfred T. Powell
ATTORNEY

INVENTOR.
WINFRED T. POWELL
BY
Winfred T. Powell
ATTORNEY

INVENTOR.
WINFRED T. POWELL

Dec. 1, 1953          W. T. POWELL                    2,661,396
              LINE FINDER WITH DIFFERENTIAL TEST RELAY
Original Filed July 10, 1947                       12 Sheets-Sheet 10

INVENTOR.
WINFRED T. POWELL
BY Winfred T. Powell
ATTORNEY

INVENTOR.
WINFRED T. POWELL
BY Winfred T. Powell
ATTORNEY

UNITED STATES PATENT OFFICE 2,661,396

LINE FINDER WITH DIFFERENTIAL TEST RELAY

Winfred T. Powell, Rochester, N. Y., assignor to Stromberg-Carlson Company, a corporation of New York Original application July 10, 1947, Serial No. 759,972. Divided and this application January 15, 1949, Serial No. 71,152

5 Claims. (Cl. 179—18)

The present invention concerns improvements in or relating to telephone systems and it more particularly pertains to automatic telephone systems.

The present application is a division of my co-pending application Serial No. 759,972, filed July 10, 1947, now Patent No 2,541,936.

One object of the present invention relates to a register-sender type automatic telephone system, in which a comparatively few relay type register-senders are provided for controlling the various switching stages in the system. The switching equipment is preferably of the step-by-step switch type, known to the trade as XY switches.

Another object of the present invention relates to the use of relay type allotters for allotting links in advance of calling conditions on calling lines. Since there are comparatively few register-senders and comparatively few allotters in a large automatic telephone system, such as contemplated by the present invention, and since it is usually required that the register senders and allotters be extremely fast and reliable in operation, these units of the present invention are made up of relays only.

Still a further object of the present invention is the provision of differentially controlled test relays in the line finder and selector finder circuits, whereby these relays are quickly released to stop the finder operation on the marked line or trunk.

It is a still further object of the present invention to provide two sets of counting relays in each register-sender, one set for registering the impulses from the calling dial, the other set for registering the impulses transmitted from the register-sender to the switch train, with a correspondence or matching circuit arrangement interconnecting these two counting relay sets, whereby sending from the register-sender is stopped when the number of impulses transmitted therefrom corresponds to the number of impulses received therein from the calling dial.

Another object of the present invention relates to a by-pass arrangement, whereby the register-sender is discharged after transmitting only one digit, instead of waiting for the transmission of four or five digits representing the usual number of digits for selecting the called station. This arrangement is usually for clearing out a register-sender when a single digit number, 0 for toll, for example, is dialled into the register-sender.

Other objects, purposes and characteristic features of the present invention will be in part obvious from the accompanying drawings and in part pointed out as the description thereof progresses.

Figure 13:
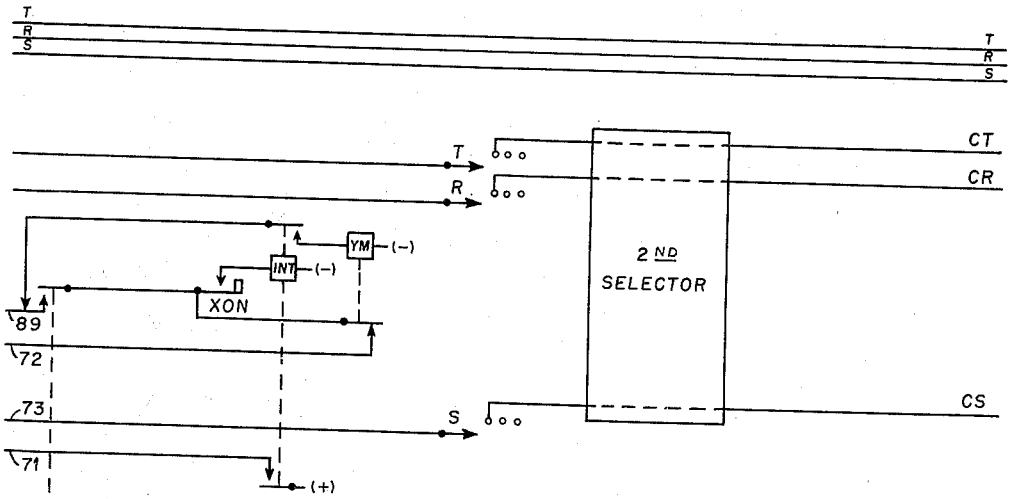

In describing the invention in detail, reference will be made to the accompanying drawings in which like characters designate corresponding parts and in which Figs. 1 to 12, inclusive, when arranged in accordance with the diagram of Fig. 13 and with correspondingly identified lines in alignment disclose a sufficient amount of circuits for an understanding of the various features provided by the present invention.

For the purpose of simplifying the illustrations and facilitating the explanation, the various parts and circuits constituting the embodiment of the invention have been shown diagrammatically and certain conventional illustrations have been employed, the drawings having been made more with the purpose of making it easy to understand the principles and mode of operation than with the idea of illustrating the specific construction and arrangement of parts that would be employed in practice. For example, the various relays and their contacts are illustrated in a conventional manner, with all of the contacts associated with a particular relay being illustrated as controlled by this relay by means of a dashed line associating the relay coil and associated contacts. The negative side of the common exchange battery is indicated by a minus sign in parenthesis and the positive side of the same exchange battery, which is usually grounded, is indicated by a positive symbol in parenthesis.

It is believed that the invention will be best understood by explaining the operation of the various circuits when a call is originated from a particular calling line, for example line #34 shown in the upper left-hand corner of Fig 1, this call being directed to the wanted station by dialing a five-digit number, these digits comprising a thousands or office digit, a hundreds digit, a tens digit, a units digit and a station digit. For convenience in describing the various circuit operations, it will be assumed that the calling party dials #31111.

It will also be described how the circuits function when the calling subscriber dials a single digit, #0 for example, in the register for causing the first selector to advance to the 0 level for selecting trunks to a toll board or the like.

When the receiver is removed at the calling station, line #34 for example, a circuit is closed for operating line relay LR of the line circuit, extending from (+), break contact of cut-off relay CO, line and substation circuits in series, break contact of relay CO and winding of relay LR to (—). Relay LR operates and, at its upper break-make contact immediately applies (+) to the sleeve terminal S leading to the connector switch banks for making this line busy to incoming calls.

Relay LR also closes a circuit for operating the allotter group relay of the line finder allotter, which corresponds to the idle allotted link. It will be assumed that the line finder #1 of link #1 is idle and allotted as marked by the associated allotter relays IAL and IALG being in their normal deenergized positions. The circuit for operating relay IALG extends from (+), make contact of relay LR, common start conductor (common to all lines in the same 100 line group), break contact of allotter guard relay GD, break contact of allotter relay IAL and winding of allotter group relay IALG to (—). The operation of relay IALG (or any other ALG relay associated with any other link of this same group) closes a circuit from (+), make contact of the operated ALG relay and winding of relay GD to (—) for operating the GD relay. A locking circuit is now established for relay IALG which extends from (+) on the common start conductor, make contact of relay GD, break contact of relay IAL, make contact and winding of relay IALG to (—).

Since the allotter group relay (IALG in this example) is operated the X start relay XST of the line finder is operated for causing the line finder switch to operate in its primary or X direction. This circuit for relay XST extends from (+), make contact of relay IALG, break contact of the X off-normal contacts of the finder switch in its normal position and upper winding of relay XST to (—). The operation of relay XST immediately closes a bridge path around the normally closed X off-normal contacts for maintaining this circuit to the XST relay after the line finder is operated from its normal position.

The operation of relay XST closes a self-interrupting circuit for X magnet XM which extends from (+), make contact of relay XST, break contact and winding of magnet XM to (—). This circuit causes the X magnet to be intermittently operated for driving the finder switch brushes in their primary or X direction. This self-interrupting circuit for the X magnet is effective in the present example to drive the line finder switch to the third level, since this is the level in which the calling line is located. When the X brush XB (which is operated only during the X movement of the finder switch) reaches the marked level, level #3 in the present example, a circuit is closed from (+), make contact of relay LR, marking conductor which is common to all lines in the third level, level #3 terminal and brush XB, make contact and lower winding of relay XST to (—). This energizes the lower winding of relay XST in a direction opposite to the upper winding energization and thus quickly releases this relay. When relay XST is released, both its upper and lower windings are now open so that it cannot be again operated until the associated finder switch is restored to normal and used again. The release of relay XST opens up the energizing circuit of magnet XM, thus stopping the switch at the marked level and preventing its further stepping in the X direction.

With the line finder being off-normal and with relay XST being released, a circuit is closed for operating the Y start relay YST which extends from (+), make contact of relay IALG, X off-normal contact XON in its off-normal position, break contact of relay XST, Y off-normal contact YON in its normal position and lower winding of relay YST to (—). Relay YST immediately closes a bridge path across the YON contacts for locking this relay in its energized position during the Y stepping operation.

The Y magnet YM is now operated over a self-interrupting circuit extending from (+), make contact of relay YST, break contact and winding of magnet YM to (—) for advancing the line finder in its Y or secondary movement until it finds the marked calling line.

When the calling line is found, a circuit is closed from (+), make contact of relay LR, terminal and Y brush YB, make contact and upper winding of relay YST to (—) for differentially energizing relay YST and quickly releasing its armatures. The release of relay YST opens up the Y magnet circuit and both windings of the relay so that this relay cannot be again energized until this finder is restored to normal and used again.

Referring back to the operation of relay IALG of the line finder allotter, a circuit is closed for operating the allotter group relay of the register-sender allotter, the particular allotter group relay of this allotter being operated as determined by the register-sender which is idle and allotted. It will be assumed that the #1 register-sender is idle and allotted, consequently the allotter relays IAL and IALG corresponding to the #1 register-sender will be in their normal or de-energized conditions. The operation of relay IALG of the line finder allotter closes a circuit for operating relay IALG of the register-sender allotter extending from (+), make contact of relay IALG of the line finder allotter, register-sender allotter conductor RSA, break contact of guard relay GD of the register-sender allotter, break contact of relay IAL and winding of relay IALG to (—). Relay IALG of the register-sender allotter closes an obvious circuit for operating relay GD, which in turn transfers the winding of relay IALG from its above described operating circuit to a locking circuit, extending from conductor RSA, make contact of relay GD, break contact of relay IAL, make contact and winding of relay IALG to (—).

Relay IALG of the register-sender allotter closes a circuit for operating the X start relay XST of the selector finder, this circuit extending from (+), make contact of relay IALG, break contact of X off-normal springs XON of the selector finder and lower winding of relay XST to (—). The operation of relay XST closes a bridge circuit across the XON contacts for maintaining relay XST energized after the selector finder begins stepping in its X direction. Relay XST closes a circuit for operating the X magnet of the selector finder extending from (+), make contact of relay XST, conductor 91, break contact and winding of magnet XM to (—). Magnet XM operates in a self-interrupted manner for stepping the selector finder in its primary or X direction until it reaches the level associated with the line finder-selector link in use on this call, as marked by a connection to (+) on conductor SXB by way of a make contact of relay IALG of the line finder allotter. Since relay IALG of the line finder allotter has marked the #1 line finder, it being assumed that this line finder is in the first level of the selector finder, then this circuit to (+) on conductor SXB being connected to the first level contact of brush XB of the selector finder, when the selector finder reaches the first level this circuit to (+) is extended through brush XB, make contact and upper winding of relay XST to (—) for differentially energizing this relay and causing it to release.

The release of relay XST opens up the circuit to the selector finder X magnet XM thus stopping the operation of this switch in its X direction. A circuit is now closed for operating the selector finder in its Y direction which extends from (+), make contact of relay IALG of the register-sender allotter, X off-normal make contact XON, break contact of relay XST, conductor 92, Y off-normal contact YON in its normally closed position and lower winding of relay YST to (—). Relay YST operates and closes a bridge circuit around this YON contact for maintaining this relay energized after the switch begins to step in its Y direction.

Relay YST closes an obvious circuit through the self-interrupting contact of Y magnet YM for automatically advancing the selector finder in its Y direction.

It will be assumed that the line finder selector finder link corresponds to the first terminal in the first level of the selector finder. Consequently, when the selector finder takes one X step (as previously described) and one Y step the upper winding of relay YST will be differentially energized for releasing this relay over a circuit extending from (+), make contact of relay IALG of the line finder allotter, conductor SYB, the first terminal and Y brush YB of the selector finder, make contact and upper winding of relay YST to (—).

Since the line finder has found the calling line and since the selector finder has found the line finder-first selector link, it is now in order to operate finder cut-in relay FCI of the line finder and register cut-in relay RCI of the selector finder. The circuits for operating these relays will be traced a little later. The operation of relay FCI extends the sleeve circuit of the first selector back through the line finder to the cut-off relay of the calling line and also opens up the release magnet RM circuit of the line finder for preventing the operation of this magnet until the connection is released. Relay FCI also operates the allotter relay of the line finder allotter for allotting the next line finder-first selector link for the next call. The operation of relay RCI links the allotter sender to the allotted line finder-first selector link.

Referring back to the operation of relay IALG of the register-sender allotter, a preliminary or booster circuit is closed for operating calling bridge relay CB of the register-sender in advance of the extension of the calling line to the windings of this CB relay. This circuit may be traced from (+), resistor R10, make contact of relay IALG, sender ring conductor SR extending from Fig. 2, through Figs. 3 and 7 to Fig. 8, and upper winding of relay CB to (—). Relay CB closes an obvious circuit for operating slow acting relay SA and this relay closes a circuit for operating relay CX of the incoming counting relays, this circuit extending from (+), make contact of relay SA, break contact of relay CRLP, conductor stick 1, break contacts of counting relays CO to C1, inclusive and winding of relay CX to (—). This prepares the incoming counting relays for receiving the first digit transmitted by the calling dial.

The circuit for operating relay FCI of the line finder and relay RCI of the selector finder may now be traced from (+), make contact of relay SA of the register-sender, conductor SS extending from Fig. 8 through Figs. 7 to Fig. 3, Y off-normal contact YON of the selector finder, break contact of relay YST, upper winding of relay RCI, selector finder brush SFS and its associated contact, break contact of switching relay SW of the first selector, line finder sleeve conductor LFS, Y off-normal contact YON of the line finder, break contact of relay YST and winding of relay FCI to (—). Relay RCI connects its lower winding to the sleeve conductor SS leading down to the register-sender, thus completing a locking circuit for this relay.

Relay IAL of the line finder allotter is now operated over a circuit extending from (+), upper winding of relay IAL, make contact of relay FCI and resistor R12 to (—). Relay IAL closes a locking circuit for itself by way of its lower winding to (+) at the normally closed break contact of relay I0AL and also to (+) at the make contact of relay GD.

The operation of relay IAL opens up and releases relay IALG, which in turn opens up and releases relay GD, after which the next line finder may be allotted since the circuit through the make contact of relay IAL to the next ALG relay is completed at a break contact of relay GD.

Relay IAL of the register-sender allotter is likewise operated over a circuit extending from (+), lower winding of this IAL relay, conductor 93, make contact of relay RCI and resistor R11 to (—). The operation of relay IAL short-circuits the upper winding of relay RCI for excluding this winding from the sleeve circuit leading back to the calling line, it being understood that relay RCI now remains energized by way of its locking circuit including its lower winding. The operation of relay IAL of the register-sender allotter opens up and releases relay IALG, which in turn opens up and releases relay GD, thus completing the allotting circuit so that the next register sender can be allotted for the next call. The release of relay IALG of the register-sender allotter opens up the above described preliminary pulse circuit for relay CB of the sender, but this does not take place until after the calling line has been extended to the windings of this CB relay by way of the line finder and selector finder brushes as will be later described.

Both the line finder allotter and register sender allotter are arranged for providing the rotating allotting feature, that is the allotting will take place from link to link until all links of the group have been allotted even though previously used links are dropped out before the allotting steps are completed all the way through. This is an advantage because it causes the links to be used in rotation, thus providing equal wear and tear. This is because the freeing or clearing out of a link does not release the associated AL relay for again allotting this link until all links have been used up to and including the last of the group, thus opening up at a break contact of the last AL relay the locking circuits for all previous AL relays, including their locking windings. It will be noted that the line finder allotter illustrates that there are 10 AL relays. This is because it is assumed that there are ten line finder-first selector links in each 100-line group. The register-sender allotter indicates that there are 25 AL and ALG relays in the group. This is because it is assumed that 25 common register-senders are provided for serving all lines in a system of 1000-line capacity.

It has already been explained how relays CB, SA and CX of the sender are operated in response to the preliminary impulse applied to the CB relay when the register-sender allotter relay 1ALG is operated. The calling line circuit is connected to the CB relay of the register-sender before relay 1ALG is released to open up this preliminary impulse circuit. The circuit for energizing relay CB over the calling line may be traced from (+), lower winding of relay CB, tip conductor ST, make contact of relay RCI, sender finder tip brush SFT and its associated contact, break contact of relay SW of the first selector, conductor LFT, line finder brush LFT and its associated contact, calling line and substation circuits in series, contact and associated line finder brush LFR, conductor LFR, break contact of relay SW, contact and associated selector finder brush SFR, make contact of relay RCI, ring conductor SR and upper winding of relay CB to (—).

With relay FCI of the line finder and relay RCI of the selector finder operated a circuit is closed for operating cut-off relay CO of the calling line, which may be traced from (+), make contact of relay SA of the register-sender, sleeve conductor SS, Y off-normal contact YON of the selector finder, break contact of relay YST, conductor 94, make contact of relay 1AL of the register-sender allotter, conductor 95, brush SFS and its associated contact of the selector finder, break contact of relay SW of the first selector, conductor LFS, Y off-normal contact YON of the line finder, break contact of relay YST, make contact of relay FCI, line finder brush LFS and its associated contact and winding of relay CO to (—). The operation of relay CO opens up and releases relay LR and this latter relay switches the connector sleeve conductor S from direct (+) to (+) coming back over brush LFS of the line finder by way of the circuit just described.

Referring back to the operation of relays CB, SA and CX of the register-sender, changeover relay CHO is operated in advance of the dialing operation, in order to give it a preliminary soak before intermittently energizing its winding. The circuit for operating relay CHO extends from (+), make contact of relay SA, break contact of relay CRLP, make contact of relay CX and winding of relay CHO to (—). A circuit is now closed for operating the counting release relay CRL which extends from (+), make contact of relay SA, winding of relay CRL, make contact of relay CHO and resistor R15 to (—). Relay CRL operates and closes a circuit for operating its repeater relay CRLP by extending its own operating circuit from (+) to the winding of relay CRLP.

Dial tone is now connected to the calling line to indicate that dialing may proceed. This circuit may be traced from the common dial tone conductor, condenser C10, make contact of relay CRLP, make contact of relay CX, conductor 1DT, break contact of relay 1TF, conductor 2DT to the right-hand terminal of the lower winding of relay CB which is connected to the calling station over the above described circuit.

Since it was assumed that the first digit is #3, three impulses are transmitted over the line for intermittently releasing relay CB. During the time that relay CB is released and relay SA is de-energized, this latter relay maintains its armatures attracted until the next operation of the CB relay by reason of its slow acting characteristics. The first release of relay CB closes a circuit for operating the #1 counting relay which may be traced from (+), break contact of relay CB, make contact of relay SA, pick-up conductor, make contact of relay CX and winding of relay C1 to (—). The operation of relay C1 opens up the above described operating circuit for relay CX including conductor stick 1, but relay CX is not released at this time because of a locking circuit extending from (+), make contact of relay SA, break contact of relay CB, conductor stick 2, make contact and winding of relay CX to (—).

When relay CB is energized at the end of the first impulse, this stick 2 conductor is de-energized for releasing relay CX. When relay CB releases at the beginning of the second impulse, a circuit is closed for operating relay C2 which extends by way of the pick-up conductor, break contact of relay CX, make contact of relay C1 and winding of relay C2 to (—). When relay C1 was operated, as previously described, it was locked in its operated condition to (+) on conductor stick 1, this conductor being extended back to the make contact of relay SA by way of the upper make contact of relay CRL in multiple with the upper break contact of relay CRLP. When relay C2 operates, this stick 1 conductor is switched from relay C1 to relay C2, but relay C1 does not release at this time because relay CB is de-energized for extending (+) to conductor stick 2 and thence through break contact of relay CX and make contact of relay C1 to its winding.

Relay C2 extends the circuit from (+) on the stick 1 conductor to its own winding for locking relay C2. When relay CB is energized at the end of the second impulse, the stick 2 conductor is de-energized which is effective to release relay C1.

The release of relay CB at the beginning of the third impulse extends the (+) on the pick-up conductor by way of break contacts of relays CX and C1 and a make contact of relay C2 to the winding of relay C3 for operating this latter relay. Relay C3 transfers the stick 1 conductor from relay C2 to relay C3 for locking this latter relay operated. Relay C2 does not release at this time because relay CB is released for applying (+) to conductor stick 2 which is extended through break contacts of relays CX and C1 and a make contact of relay C2 to the winding of this latter relay.

When relay CB is energized at the end of the third impulse, (+) is removed from conductor stick 2 for releasing relay C2. This leaves relay C3 operated as a result of the transmission of three impulses to the incoming counting relay circuit.

The intermittent release of relay CB during the transmission of impulses extends a circuit from (+), make contact of relay SA, break contact of relay CB, make contact and winding of relay CHO to (—) for maintaining this relay energized over its locking circuit. At the end of the series of impulses, relay CB remains energized sufficiently long to measure off a period of time which is longer than the slow acting release time of relay CHO, therefore, this latter relay is released to mark the end of the transmission of the first digit.

When relay CHO is released to mark the end of the first digit, the relay or relays of the first digit register may be operated to record and store the number of impulses dialed for this digit. In the present example, #3 was dialed for the first digit, consequently relay 1C of the first or thousands register is operated over a circuit extending from (+), make contact of relay SA, winding of counting release relay CRL, break contact of relay CHO, make contact of relay CRL, make contact of relay C3, (left operated in response to #3 being dialed), conductor C, break contacts in series of transfer relays 5TF to 1TF, inclusive and winding of relay 1C to (—). Since this circuit extends through the winding and make contact of relay CRL, this relay remains energized after the release of relay CHO by way of this locking circuit. Relay 1C (or any other relay of the first register which may be operated in response to the first digit) is locked over a circuit extending from (+), make contact of relay SA, make contact of relay CRLP, conductor TF, break contact of relay 1TF, break contacts in multiple of relays 2X and 2TF, make contact and winding of relay 1C to (—).

This circuit for locking relay 1C may be traced back to the left-hand terminal of relay CRL from the winding of relay 1C, break contacts in series of relays 1TF to 5TF, inclusive, conductor C, make contact of relay C3, make contact of relay CRL and break contact of relay CHO to the winding of relay CRL.

Since the other terminal of relay CRL is connected to (+) at another make contact of relay SA, relay CRL is short-circuited and released for in turn opening up and releasing relay CRLP. During the interval between the release of relay CRL and the release of relay CRLP, the counting relay left operated (in this example relay C3) is released because the stick 1 conductor is opened at a make contact of relay CRL and a break contact of relay CRLP. When relay CRLP releases, conductor stick 1 is again connected to (+) for again energizing relay CX to prepare the incoming counting relay circuit for the next digit. The release of relay CRLP also closes a circuit for operating the first transfer relay 1TF extending from (+), make contact of relay SA, conductor 1MG, winding of relay 1TF, break contacts in multiple of relays 2X and 2TF, make contact and winding of relay 1C to (—). The operation of relay 1TF transfers the four conductors A, B, C and D from the relays of the first register to the relays of the second or hundreds register, comprising relays 2A, 2B, 2C and 2D.

With relay CX operated, relays CHO, CRL and CRLP are again operated in sequency over the previously described circuits.

It will be convenient to explain the complete operation of registering the digits dialed into the register-sender and thereafter referring back for an explanation of how the register-sender functions to re-transmit these digits out through the automatic switches. Relay CB is released once in response to dialing #1 for the second digit, it being understood that this CB relay does not remain in its released position during the transmission of all digits long enough to permit relay SA to release. Consequently, relay SA remains operated until released after the re-transmission has been effected, as will be later described.

The release of relay CB again closes the above described circuit for operating counting relay C1 and for locking relay CHO in its operated position. The operation of relay CB at the end of the single impulse transmission is effective to release relay CX and, since this is the end of the second digit, relay CHO will be released.

Relay 2A of the hundreds register is now operated to register the second digit, which in this case is #1, the circuit being traced from (+), make contact of relay SA, winding of relay CRL, break contact of relay CHO, make contact of relay CRL, make contact of the counting relay left operated in response to the second digit (in this example relay C1), conductor A, break contacts in series of relays 5TF to 2TF inclusive, make contact of relay 1TF and winding of relay 2A to (—). The above described locking circuit for relay CRL is thus again completed. Relay 2A closes a locking circuit for itself which extends from (+), make contact of relay SA, make contact of relay CRLP, conductor TF, make contact of relay 1TF, break contact of relay 2TF, break contacts in multiple of relays 3X and 3TF, make contact and winding of relay 2A to (—).

The operation of the relay of the hundreds register extends its locking circuit back over conductor A to the left-hand terminal of relay CRL for releasing this relay and in turn releasing relay CRLP, in the previously described manner. During the interval between the release of relay CRL and the release of relay CRLP the counting relay left operated (in this example relay C1) is released because (+) is removed from conductor stick 1. When relay CRLP is released, relay CX is again operated for preparing the incoming counting relay circuit for the third digit. The release of relay CRLP closes a circuit for operating relay 2TF which may be traced from (+), make contact of relay SA, conductor 1MG, winding of relay 2TF, break contacts in multiple of relays 3X and 3TF, make contact and winding of relay 2A to (—). The operation of relay 2TF transfers the four conductors A, B, C and D from the hundreds register to the tens register.

The operation of relay CX again completes the circuit for effecting the operation of relay CHO after which relays CRL and CRLP are again operated all in the previously described manner.

When relay CB is released for transmitting the third or tens digit, relay C1 is again operated and relay CHO is again locked operated. When relay CB is operated at the end of this impulse, relay CX is released and, since this is the end of the impulse transmission for the third digit, relay CHO is released.

The release of relay CHO again closes the above circuit for locking relay CRL and for operating the tens register relay (in this example relay 3A) because relay C1 is operated for selecting conductor A which extends through break contacts of relays 5TF, 4TF and 3TF, conductor 96, and a make contact of relay 2TF and conductor 97 to relay 3A. Relay 3A operates and closes a locking circuit for itself which includes break contacts in multiple of relays 4TF and 4X and conductor TF in a manner previously explained. The closure of the locking circuit for relay 3A is effective to short-circuit and release relay CRL, after which relay CRLP is released, in a manner which will be understood from the previous explanation. During the interval between the release of relay CRL and release of relay CRLP, the counting relay left operated (in this example relay C1) is released. When relay CRLP is released, relay CX is again operated to prepare the incoming counting relay circuit for the units or fourth digit. Relay 3TF is now operated over a circuit which may be traced from (+), make contact of relay SA, conductor 1MG, winding of relay 3TF, break contacts in multiple of relays 4TF and 4X, make contact and winding of relay 3A to (—). The operation of relay CX is again effective to operate relay CHO which in turn effects the operations of relays CRL and CRLP in sequence.

When relay CB is released in response to the impulse of the fourth digit, relay CI is again operated and relay CHO is again locked operated. The operation of relay CB at the end of this impulse is effective to release relay CX and, since this is the end of the impulse transmission for this digit, relay CHO is released.

Relay 4A of the units register is now operated and relay CRL is locked operated over a circuit from (+), make contact of relay SA, winding of relay CRL, break contact of relay CHO, make contact of relay CRL, make contact of relay CI, conductor A, break contact of relay 5TF, break contact of relay 4TF, make contact of relay 3TF and winding of relay 4A to (—). Relay 4A is locked operated by way of its make contact, break contacts in multiple of relays 5TF and 5X, break contact of relay 4TF, make contacts in series of relays 3TF, 2TF and ITF, conductor TF, make contact of relay CRLP and make contact of relay SA to (+). This locking circuit for the relay of the units register is extended back over the previously described operating circuit for this relay, including conductor A for short-circuiting and releasing relay CRL. The release of relay CRL effects the release of relay CI after which relay CRLP is released. Relay CX is now again operated to prepare the incoming counting relay circuit for the fifth or station digit. Relay CX again closes the above described circuit for operating relay CHO after which relays CRL and CRLP are again operated, as previously explained. Relay 4TF is now operated for transferring the four conductors A, B, C and D from the units register to the station register. This circuit for operating relay 4TF may be traced from (+), make contact of relay SA, conductor IMG, winding of relay 4TF, break contacts in multiple of relays 5TF and 5X, make contact and winding of relay 4A to (—).

When the fifth digit is dialed, relay CB is again released for operating relay CI and for locking relay CHO. When relay CB operates at the end of this impulse, which is the end of the digit, relay CX is released and the locking circuit for relay CHO is opened for effecting the release of this latter relay. Relay CRL is locked operated and relay 5A is operated over a circuit which may be traced from (+), make contact of relay SA, winding of relay CRL, break contact of relay CHO, make contact of relay CRL, make contact of relay CI, conductor A, break contact of relay 5TF, make contact of relay 4TF and winding of relay 5A to (—). Relay 5A closes a locking circuit for itself which may be traced from (+), make contact of relay SA, make contact of relay CRLP, conductor TF, make contacts of relays ITF to 4TF inclusive, break contact of relay 5TF, conductor 16, break contact of relay 6X, conductor 15, make contact and winding of relay 5A to (—). This locking circuit for the relay of the station register is extended back over conductor A and the make contacts of relays CI and CRL for short-circuiting and releasing this latter relay. The release of relay CRL effects the release of relays CI and CRLP in sequence. A circuit is now closed for operating relay 5TF extending from (+), make contact of relay SA, conductor IMG, winding of relay 5TF, make contact and winding of relay 5A to (—). Relays CX, CHO, CRL and CRLP are again operated over their previously described circuits, but since this is the last digit the operation of these relays at this time is of no consequence.

It will be recalled that dial tone was applied to the calling line when the register-sender was first seized, over make contacts of relays CRLP and CX and by way of a break contact of relay ITF. Since relay CX is released at the beginning of the transmission of the first series of impulses, dial tone is disconnected from the calling line at this point. However, relays CX and CRLP operate between each pair of digits and it becomes necessary to open up the dial tone circuit at another point to prevent reapplication of the dial tone to the calling line between digits. This is done at the upper-most break contact of relay ITF, this relay being operated at the end of the first digit to permanently open the dial tone connection during this call before relays CX and CRLP are operated to connect the dial tone circuit to the calling line.

This completes the operation effected in response to the dialing of the five digits. It will now be explained how the circuits function to retransmit the proper impulses outward from the register-sender to the automatic switches:

Relay PO of the register-sender is a polarized type relay, with its contacts remaining in the last position to which they are actuated by the energization of a winding of the relay. In other words, they are not restored from their last actuated positions until the next energization of the relay winding in an opposite direction. It will now be explained how this relay is intermittently operated for swinging its contacts to the right and left-hand positions at a rate which is proper for impulse transmission, for example 10 operations per second. It may be that this polar relay leaves its contacts in their right-hand positions from a previous call, in which case it is necessary to swing them over to the left before impulse transmission is started. This is done by energizing its lower winding in the direction of the arrow over a circuit extending from (+), make contact of relay RCI of the selector finder, conductor GRD, resistor R3, lower winding of relay PO and resistor RI to (—). Since relay RCI is operated well in advance of the conditioning of the circuits for impulse transmission by relay PO, this preliminary energization of the lower winding of this relay is effective to swing its contacts to the left in plenty of time to get the circuit prepared for impulse transmission.

Off-normal relay ON of the register-sender is operated after the first digit is transmitted from the dial and the first transfer relay ITF is operated. The circuit for operating relay ON extends from (+), make contact of relay SA of the register-sender, conductor 2MG, make contact of relay ITF, conductor 98, and winding of relay ON to (—). Relay ON closes a locking circuit for itself to (+) on conductor 2MG, which is independent of the make contact of relay ITF.

Relay ON applies (+) to conductor GRD to maintain this conductor grounded independent of the make contact of relay RCI. Relay ON extends a connection from (+) by way of a contact of relay PO in its left-hand position and resistor RI to (—). This applies (+) potential to the left-hand terminals of both windings of relay PO, current in this circuit divides, part of it flowing through resistor RI to (—) and part flowing through the lower winding of relay PO and resistor R2 to (—). Sufficient current flows through the lower winding of relay PO in the direction opposite to the arrow for swinging its contacts to the right. It will be noted that, before the contacts leave their left-hand positions, the same potential is connected to both terminals of the upper winding, that to the left-hand terminal being through a contact of relay PO in its left-hand position and that to the right-hand terminal of the upper winding being traced through a make contact of relay ON and condenser CN to conductor GRD, which is connected to (+). When relay PO swings its armatures to the right, the circuit to (+) connected to resistor R1 is opened and a circuit is now completed from (+) on conductor GRD, condenser CN, make contact of relay ON, upper winding of relay PO and resistor R1 to (—). This causes condenser CN to be charged, with the charging current flowing through the upper winding of relay PO and dividing and returning through the lower winding of relay PO to (—) through resistor R2. This current is in such a direction (opposite to the arrows in both windings) as to hold the contacts of relay PO in their right-hand positions. When the charging current through the upper winding of relay PO drops below a certain value (as the condenser becomes charged) the current flowing in this winding is reduced to zero, while at this time current from (+) on conductor GRD flows through resistor R3, the lower winding of relay PO and resistor R1 in the direction of the arrow associated with the lower winding of this relay for swinging its contacts to the left.

When relay PO has moved its contacts to the left, (+) potential is again connected to the junction point between the left-hand terminals of both windings of relay PO and resistor R1. Condenser CN will then discharge through the upper winding of relay PO, causing current to flow through this winding in the proper direction for holding the contacts in their left-hand positions. Current is furthermore reversed through the lower winding of relay PO (with its contacts in its left-hand position) flowing through resistor R2 to (—). This tends to swing the contacts of relay PO to the right, but cannot affect this operation until the condenser discharge current through the upper winding drops below a certain value. At the time that this condenser current drops below this certain value, relay PO swings its contacts to the right. This intermittent operation of relay PO for swinging its contacts back and forth continues until the circuit is cleared out as will be later explained.

Before proceeding with the explanation of the operation of the ICB, ISA and counting relays of the outgoing counting relay group in response to the operation of relay PO as just described, reference will be made to the closure of the conductors of the trunk circuit leading to the first selector for operating relays CB and SA of this selector in preparation for the receipt of impulses transmitted from the register-sender. When relay RCI of the selector finder is operated as previously explained, a circuit is closed for operating relay CB of the first selector which may be traced from (+), upper winding of relay CB, break contact of relay CT, terminal and brush 1ST of the selector finder, make contact of relay RCI, conductor OPT, break contact of relay 1Y of the register-sender, resistor R5, conductor OPR, make contact of relay RCI, brush 1SR and its associated contact, break contact of relay CT and lower winding of relay CB to (—). Relay CB operates and closes a circuit for operating relay SA of the first selector, this circuit extending from (+), break contact of relay CT, make contact of relay CB and winding of relay SA to (—).

Referring back to the register-sender, the operation of relay ON swings the contacts of relay PO to the right, as previously described, and at the same time a circuit is closed from (+), make contact of relay ON, contact of relay PO in its left-hand position, break contact of relay ICHO, break contact of relay 1Y and winding of relay 1X to (—). Since the circuits to relay 1X and to the winding of relay PO for swinging this latter relay to the right are closed at the same time, relay 1X will not operate because of its "slow operate" characteristics, since the above described circuit to its winding is immediately opened.

The circuit is now closed for operating relay ICB which extends from (+), break contact of relay ICHO, make contact of relay ON, break contact of relay 1Y and winding of relay ICB to (—). Relay ICB closes an obvious circuit for operating relay ISA and relay ISA closes a circuit for operating relay ICX of the outgoing counting relay group extending from (+) on master ground conductor 2MG, break contact of relay CHOP, make contact of relay ISA, stick 1 conductor, break contacts in series of relays IC11 to IC1 inclusive, and winding of relay ICX to (—).

When relay PO next swings its contacts to the left a circuit is closed for operating relay 1X which extends from (+), make contact of relay ON, contact of relay PO in its left-hand position, break contact of relay ICHO, break contact of relay 1Y and winding of relay 1X to (—). Relay 1X has time to operate this time and when relay PO is next swung to the right a circuit is closed for operating relay 1Y and locking relay 1X which extends from (+), break contact of relay ICHO, make contact of relay ON, winding of relay 1Y, make contact and winding of relay 1X to (—). The operation of relay 1Y opens up and releases relay ICB, this latter relay closing a circuit for operating counting relay IC1, which extends from (+), break contact of relay ICB, make contact of relay ISA, pick-up conductor, make contact of relay ICX and winding of relay IC1 to (—). Relay IC1 switches the stick 1 conductor from relay ICX to the winding of relay IC1 for closing a locking circuit for this latter relay and for opening up the previously described operating circuit for relay ICX. Relay ICX does not release at this time, however, because of another locking circuit extending from (+) on conductor 2MG, break contact of relay CHOP, make contact of relay ISA, break contact of relay ICB, conductor stick 2, make contact and winding of relay ICX to (—).

When relay PO next swings to the left, a circuit is closed for operating relay ICB which extends from (+), make contact of relay ON, contact of relay PO in its left-hand position, break contact of relay ICHO, make contact of relay 1Y and winding of relay ICB to (—). The operation of relay ICB opens up the above described locking circuit for relay ICX including conductor stick 2, thus effecting the release of this latter relay.

It will be noted that relay PO is allowed to make one swing from its left-hand position to its right-hand position, followed by another swing to the left and another swing to the right before the trunk circuit leading to the first selector is opened. This is because relay 1Y maintains a closure across conductors OPT and OPR during these first swings of relay PO. This is to permit relay PO to settle down and attain a constant rate of cycling before it is connected to the trunk circuit.

With relay PO swung to the left, after relay 1Y is operated, the circuit to the first selector is opened for providing the first impulses of the series. When relay PO next swings to the right, the trunk circuit is closed for marking the end of the first impulse of the series. This swing of relay PO to the right also opens up the circuit to relay 1CB for effecting the release of this latter relay. The release of relay 1CB closes a circuit for operating counting relay 1C2 extending from (+), break contact of relay 1CB, make contact of relay 1SA, pick-up conductor, break contact of relay 1CX, make contact of relay 1C1 and winding of relay 1C2 to (—). Relay 1C1 is prevented from releasing at this time by means of a connection to (+) on conductor stick 2 as previously described.

When relay PO next swings to the left to mark the beginning of the second impulse the trunk to the first selector is opened and relay 1CB is operated over the previously described circuit including a make contact of relay 1Y.

When relay PO next swings to the right to mark the end of the second impulse, relay 1CB is again released for closing a circuit for operating counting relay 1C3, which circuit includes the pick-up conductor, break contacts of relays 1CX and 1C1 in series, make contact of relay 1C2 and winding of relay 1C3 to (—). Relay 1C1 was released by the operation of relay 1CB at the beginning of the second impulse because conductor stick 2 is de-energized. The swing of relay PO to the right closes the trunk circuit leading to the first selector to mark the end of the second impulse.

When relay PO next swings to the left, relay 1CB is again operated for effecting the release of relay 1C2 by de-energizing conductor stick 2. This swing of relay PO to the left marks the beginning of the third impulse by opening the trunk conductors.

When relay PO next swings to the right, relay 1CB is released and the trunk conductors are closed for marking the end of the third impulse. Relay 1C4 is operated at this time because relay 1CB energizes the pick-up conductor and relay 1C3 is locked at this time because relay 1CB energizes the stick 2 conductor.

During the intermittent operations of relay 1CB the circuit to relay 1SA is interrupted, but this latter relay does not release because of its slow acting characteristics. It will now be explained how, even though relay PO continues to operate intermittently, relay CB remains down long enough to effect the release of relay 1SA for marking the end of the transmission of the first digit.

It will be observed that, with relay 1Y operated, relay PO pulses the outgoing trunk circuit by swinging its uppermost contact to the left for opening this trunk circuit and swinging this contact to the right for closing the trunk circuit. As previously mentioned, relay PO keeps right on swinging therefore, it is necessary to close the trunk circuit after the required number of pulses are sent out from the register-sender and keep this trunk circuit closed long enough to permit the selector switch to complete its trunk hunting operation. This is done by releasing relay 1Y and thus bridging the pulsing contacts of relay PO when the proper number of pulses are sent, in this example three for the first digit.

Since relay 1C of the thousands register was left operated in response to the registration of #3 for the first digit, a correspondence condition exists between the thousands register and the outgoing counting relay combination when three pulses have been transmitted over the trunk circuit. When relay PO swings to the right to close the trunk circuit to mark the end of the third pulse and relay 1C4 is operated at this point in the cycle, a circuit is closed for operating change-over relay 1CHO extending from (+) on the master ground conductor 2MG, break contacts in series of counting relays 1C11 to 1C5 inclusive, make contact of relay 1C4, channel conductor CH3, break contact of relay 1D of the thousands register, make contact of relay 1C, break contact of relay 1B, break contact of relay 1A, make contact of relay 1TF, conductor 11, break contact of relay CHOP and winding of relay 1CHO to (—). The operation of relay 1CHO closes a locking circuit for itself extending from (+) on conductor 2MG, make contact of relay 1TF, conductor 93, make contact of relay 1CHO, break contact of relay CHOP and winding of relay 1CHO to (—). The operation of relay 1CHO opens up the circuit leading to relays 1X, 1Y and 1CB, thus releasing relays 1X and 1Y and preventing the operation of relay 1CB until a comparatively long time interval has been measured off. The release of relay 1Y closes the trunk circuit for the purpose above mentioned before relay PO swings to the left to open this trunk circuit.

With relay 1CB released, relay 1SA releases after a time interval measured off by its slow acting characteristics for disconnecting (+) from the conductors stick 1, stick 2 and pick-up of the outgoing counting relays, thus effecting the release of the relays of this counting relay group which were left operated (in this example relays 1C3 and 1C4). This restores all of the outgoing counting relays to normal and completes a circuit for operating relay CHOP which extends from (+) on conductor 2MG, break contacts in series of all counting relays, conductor 81, make contact of relay 1CHO and winding of relay CHOP to (—). Relay CHOP closes a locking circuit for itself extending from conductor 2MG, make contact of relay CHOP, make contact of relay 1CHO and winding of relay CHOP to (—), this locking circuit maintaining relay CHOP energized independent of its operating circuit including break contacts of the counting relays.

A circuit is now closed for operating relay 2X extending from (+), make contact of relay ON, make contact of relay CHOP, conductor 12, break contact of relay LD, conductor 13, break contact of relay 2Y and winding of relay 2X to (—). This operation of relay 2X occurs at about the time relay PO is in its right-hand position, consequently when relay PO swings to the left a circuit is closed for operating relay 1CB which extends from (+), make contact of relay ON, contact of relay PO in its left-hand position, make contact of relay 1CHO, make contact of relay CHOP, make contact of relay 1CHO, make contact of relay ON, break contact of relay 1Y and winding of relay 1CB to (—). Relay 1CB closes an obvious circuit for operating relay 1SA and this relay closes the previously described circuit for operating relay 1CX. When relay PO next swings to the right, relay 1CB is released for operating relay 1C1 and locking relay 1CX, in the previously described manner. When relay PO next swings to the left, relay 1CB is again operated over the previously described circuit including the left-hand contact of relay PO and the make contacts of relays CHOP and 1CHO. This operation of relay 1CB effects the release of relay 1CX. When relay PO next swings to the right, relay 1CB is released, relay 1C2 is operated and relay 1C1 is locked operated until relay PO next swings to the left at which time relay 1CB operates for releasing relay 1C1.

Relay PO now swings to the right for releasing relay 1CB, which in turn operates relay 1C3 and locks relay 1C2. The operation of relay 1C3 opens a point in the circuit leading to relay 1CHO and since the other point in this circuit is open at a back contact of relay CHOP, relay 1CHO is released for in turn effecting the release of relay CHOP. The release of relay 1CHO, before relay CHOP releases, disconnects master ground conductor 2MG from the stick 1 and stick 2 conductors for effecting the release of relays 1C2 and 1C3. Relay 1CB is now operated over a circuit extending from (+), break contact of relay 1CHO, make contact of relay ON, break contact of relay 1Y and winding of relay 1CB to (—). Relay 1X is operated when relay PO next swings to the left over a circuit extending from (+), make contact of relay ON, contact of relay PO in its left-hand position, break contact of relay 1CHO, break contact of relay 1Y and winding of relay 1X to (—). When relay CHOP is released, the above described circuit, including conductors 12 and 13 extending to (+) through make contacts of relays ON and CHOP, is disconnected from the right-hand terminal of relay 2X, which is effective to cause the operation of relay 2Y and the locking of relay 2X over a circuit extending from (+), make contact of relay ON, winding of relay 2Y, make contact and winding of relay 2X to (—). This release of relay CHOP is again effective to extend another conductor 2MG to conductor stick 1 for again operating relay 1CX to prepare the outgoing counting relays for the next counting operation.

This operation of relay 2Y is an indication that the pause between the first two digits has been measured off to permit the selector switch to complete its trunk hunting operation. The counting and pulsing of the second digit will be held up for a short additional period of time until relay 1Y is operated as an indication that the second digit has been received in the register-sender. It is obvious that the transmission of the second digit cannot proceed until this digit has been recorded in the register-sender. In most cases this recording of the second digit will have taken place long before this particular point in the cycle, however, in the case of slow dialing of digits, it is necessary to hold off the second digit transmission until a positive indication is received that the second digit has been dialed into the register-sender. When relay PO swings to the right, after relay 2Y has been operated, a circuit is closed for operating relay 1Y and locking relay 1X which extends from (+), break contact of relay 1CHO, make contact of relay ON, winding of relay 1Y, make contact and winding of relay 1X to (—). In the event that the second digit has not been recorded, relay 2TF will not be operated. Consequently, a circuit may be traced from (+) on conductor 2MG, break contact of relay 5TF, break contact of relay 4TF, break contact of relay 3TF, conductor 82, break contact of relay 2TF, make contact of relay 1TF, conductor 83, make contact of relay 2Y, make contacts of relay 1X to the left-hand terminal of relay 1Y, this circuit locking relay 1X and short-circuiting relay 1Y to prevent its operation until relay 2TF is operated.

With relay 1Y operated and with relay PO swung to the right, relay 1CB is released for operating relay 1C1 and for locking relay 1CX. When relay PO next swings to the left, relay 1CB is operated and the trunk circuit is opened because relay 1Y is operated. The operation of relay 1CB effects the release of relay 1CX. When relay PO next swings to the right, relay 1CB is released for operating relay 1C2 and locking relay 1C1. This swing of relay PO to the right closes the trunk circuit by way of a path which is independent of the break contact of relay 1Y.

Since the second digit (#1) has now been sent, it is necessary to again stop the impulse transmission and to again measure off the pause between the second and third digits.

With relay PO swung to the right for operating relay 1C2, the correspondence condition is again established as a result of the match between digit #1 dialed into the register-sender for the second digit and digit #1 transmitted out from the register-sender for this digit. This correspondence condition is effective to operate relay 1CHO over a circuit extending from (+) on conductor 2MG, break contacts in series of counting relays 1C11 to 1C3 inclusive, make contact of relay 1C2, channel conductor CH1, break contacts in series of hundreds register relays 2D, 2C and 2B, make contact of relay 2A, make contact of relay 2TF, break contact of relay 1TF (the relays of the thousands register including transfer relay 1TF being released as will be presently described), conductor 11, break contacts in multiple of relays 1C3 and CHOP and winding of relay 1CHO to (—). Relay 1CHO operates and closes a locking circuit for itself including the circuit which is holding relay ON operated, this locking circuit being independent of relay 1TF. The reason that relay 1TF is released is that the operation of relay 2TF as an indication that the second digit has been dialed into the register-sender and the operation of relay 2X as an indication that the first digit has been sent out from the register-sender, opens up the multiple path through contacts of these two relays including the above described circuit for holding relay 1TF and relay 1C of the thousands register operated.

It will be noted that the 2X, 3X, 4X and 5X relays have been illustrated with a single break contact in Figs. 9 and 10. These are the same relays illustrated in Figs. 11 and 12, this duplicate showing of the squares indicating the windings of these relays being for the purpose of simplifying the drawings.

With relay 1CHO operated in response to the transmission out from the register-sender of the second digit, relays 1X and 1Y are released in the previously described manner. Relay PO keeps right on swinging its contacts from left to right and from right to left, but with relay 1Y released no impulses are transmitted over the trunk circuit. Furthermore, the circuit of relay 1CB is opened and this relay remains in its released position long enough to permit relay 1SA to release, which in turn effects the release of counting relays 1C1 and 1C2 and the operation and locking of relay CHOP, all in the above described manner.

A circuit is now closed for operating relay 3X extending from (+), make contact of relay ON, make contact of relay CHOP, conductor 12, break contact of relay LD, conductor 13, make contact of relay 2Y, break contact of relay 3Y and winding of relay 3X to (—). This operation of relay 3X takes place during the measuring off of the second inter-digit pause. After this inter-digit pause is measured off and relay PO swings to the left a circuit is again closed for operating relay 1CB, extending from (+), make contact of relay ON, contact of relay PO in its left-hand position, make contact of relay 1CHO, make contact of relay CHOP, make contact of relay 1CHO, make contact of relay ON, break contact of relay 1Y, and winding of relay 1CB to (—). Relay 1CB again operates relay 1SA, after which relay 1CX is again operated for preparing the outgoing counting relay circuit for counting off three impulses to mark the end of the inter-digit pause. These three impulses are counted off as a result of the swing of relay PO to the right for releasing relay 1CB, which in turn operates relay 1C1 and locks relay 1CX. When relay PO swings to the left, relay 1CB is operated for releasing relay 1CX and when relay PO swings to the right, relay 1CB is released for operating relay 1C2 and for locking relay 1C1. When relay PO next swings to the left, relay 1CB is operated for releasing relay 1C1 and when relay PO next swings to the right, relay 1CB is released for operating relay 1C3 and for locking relay 1C2. It is not believed necessary to point out the circuits in detail for controlling these outgoing counting relays, since the circuits have previously been explained.

When relay 1C3 is operated, since relay CHOP is now operated, the circuit for relay 1CHO is opened for effecting the release of this relay, which in turn opens up and releases relay CHOP. The release of relay 1CHO closes a circuit for operating relay 1CB extending from (+), break contact of relay 1CHO, make contact of relay ON, break contact of relay 1Y and winding of relay 1CB to (—). This operation of relay 1CB opens up and releases relay 1C3 and when relay CHOP is released, as previously explained, relay 1CX is again operated for preparing the outgoing counting relay circuit for sending the third digit.

The release of relay CHOP closes a circuit for operating relay 3Y and for locking relay 3X, extending from (+), makes contact of relay ON, winding of relay 3Y, make contact and winding of relay 3X to (—). This circuit is made effective because the release of relay CHOP removes (+), including conductors 12 and 13 from the junction between the windings of relays 3X and 3Y.

This operation of relay 3Y indicates that the inter-digit pause following the second digit has been measured off so that the circuits may now be conditioned for transmitting the third digit, assuming that this digit has been recorded in the register-sender from the calling station. The swing of relay PO to the left, following the release of the outgoing counting relays, as just described, closes a circuit for again operating relay 1X extending from (+), make contact of relay ON, contact of relay PO in its left-hand position, break contact of relay 1CHO, break contact of relay 1Y and winding of relay 1X to (—). The operation of relay 1X connects relay 1Y to the winding of relay 1X, but relay 1Y is not operated because its winding is now short-circuited. The operation of relay 1Y opens up the circuit of relay 1CB and closes this circuit at another point, but since relay PO swings to the right about this time, relay 1CB is released for operating relay 1C1 and for locking relay 1CX.

Relay PO now swings to the left for closing the circuit for operating relay 1CB, which in turn effects the release of relay 1CX. Since relay 1Y is now operated, this swing of relay PO to the left opens up the trunk circuit and when relay PO swings to the right, the trunk circuit is closed, thus transmitting a single impulse to the switch train. The swing of relay PO to the right releases relay 1CB for operating relay 1C2 and for locking relay 1C1.

Since this represents the digit dialed into the register-sender, correspondence is established and relay 1CHO is operated over a circuit extending from (+) on conductor 2MG, break contacts in series of outgoing counting relays 1C11 to 1C3 inclusive, make contact of relay 1C2, channel conductor CH1, break contacts in series of tens register relays 3D, 3C and 3B, make contact of relay 3A, make contact of relay 3TF, conductor 84, break contact of relay 2TF (released as will be presently described), break contact of relay 1TF, conductor 11, break contacts in multiple of relays 1C3 and CHOP and winding of relay 1CHO to (—). Relay 1CHO again closes its above described locking circuit and again opens up and releases relays 1X and 1Y, as previously explained, relay 1Y closing a path in shunt of the pulsing contacts of relay PO so that the continued swing of this latter relay is now ineffective to transmit impulses to the switches.

Relay 2TF and the relay of the hundreds register which was operated, are released. When relay 3TF is operated to indicate that the tens digit has been received and relay 3X is operated to indicate that the hundreds digit has been transmitted, the circuit for relay 2TF, including the relay of the hundreds register that was operated, is opened for effecting the release of these relays.

When relay PO swings to the left, after this correspondence condition is indicated, relay 1CB is not operated because relay 1Y is released and deenergized, consequently, there is no circuit to the winding of relay 1CB. Relay 1CB remains released long enough to release relay 1SA, which in turn effects the release of the counting relays left operated, after which relay CHOP is again operated and locked, all in the previously described manner.

Relay 4X is now operated over the above described circuit including conductors 12 and 13, make contacts of relays 2Y and 3Y, conductor 85, break contact of relay 4Y and winding of relay 4X (—). Referring to Fig. 9, the operation of relay 4X, after relay 4TF is operated, opens up and releases relay 3TF and the tens register relay which was operated in response to dialing the tens digit.

It is not believed necessary to point out in detail how the counting relays and the 1CHO and the CHOP relays are operated and released during the transmission of the other digits, since this operation is the same as previously explained. It need only to be pointed out that relay 1CHO is released for releasing relay CHOP when relay 1C3 operates to measure off the pause between the sending of the tens and units digits. The release of relay CHOP closes a circuit for operating relay 4Y and locking relay 4X, after this pause has been measured off, which circuit extends from (+), make contact of relay ON, conductor 86, winding of relay 4Y, make contact and winding of relay 4X to (—). The reason this latter circuit is effective is because the circuit to (+) on conductors 12 and 13 is opened at a make contact of relay CHOP for removing the short circuit from the winding of relay 4Y.

The 1X and 1Y relays are now operated and locked, as previously explained, the latter relay opening up the bridge across the contacts of relay PO so that this relay may again pulse the trunk conductors for sending the fourth or units digit.

When correspondence is reached between the two sets of counting relays, relay 1CHO is operated, locked and relays 1X and 1Y are released for again placing the closed circuit condition across the trunk conductors. Relay 1CB remains released in the above described manner for permitting the release of relay 1SA, which is effective to release the counting relays, after which relay CHOP is again operated and locked. Relay 5X is now operated over the above described circuit including conductors 12 and 13, this time extending through a make contact of relay 4Y and a break contact of relay 5Y to the winding of relay 5X. The relays now function as before for measuring off the inter-digit pause and when relay 1C3 is operated as an indication that this time has been measured off, relays 1CHO and CHOP are again released and relay 1X is again operated. Relay 1CX is again operated for preparing the counting relays for the station or fifth digit. Relay 1Y is operated when relay PO swings to the right for removing the short-circuit from across its winding, thus locking relay 1X in series with relay 1Y. This removes the bridge from across the pulsing contacts of relay PO, so that the swing of this relay now is effective to pulse the trunk circuit.

When correspondence is reached, relay 1CHO is again operated and relays 1X and 1Y are released as before. Relay 1CB remains released long enough to effect the release of relay 1SA, after which the counting relays are again restored to normal. When these counting relays are in their normal positions, relay CHOP is again operated and locked for closing a circuit for operating relay 6X extending from (+) on conductors 12 and 13 by way of make contacts of relays 2Y, 3Y, 4Y and 5Y and break contact of relay 6Y to the winding of relay 6X. It will be understood that relay 5Y is in its operated position because an operating circuit for itself and a locking circuit for relay 5X is completed when the short-circuit is removed from the winding of relay 5Y by the release of relay CHOP, all in the previously described manner.

This concludes the transmission of the fifth or station digit, it now being in order to release relays 5A and 5TF. This is done by removing the bridge between conductors 15 and 16 at the break contact of relay 6X when this latter relay operates. It might be well to point out at this time that relays 4A and 4TF are released when relay 5X is operated to open the circuit to these relays, since it is assumed that, at this time, relay 5TF has been operated in response to the transmission of the fifth digit.

Before proceeding with the operation of the selector circuits and the clearing out of the register-sender, it will be pointed out how the "hold back" feature is provided for each digit, recalling that the 2X, 3X, 4X and 5X relays have a break contact in multiple with the break contact of the corresponding transfer or TF relays, as indicated in Figs. 9 and 10. Relay 1X is locked and relay 1Y is short-circuited by a circuit extending through the lower make contact of relay 1X, conductor 87, and the lower make contacts of the 2Y, 3Y, 4Y, 5Y and 6Y relays and make contacts of relays 1TF, 2TF, 3TF, 4TF and 5TF respectively. Thus, a TF relay is operated as an indication that a corresponding digit has been recorded from the calling station and a Y relay is operated as an indication that the pause following the re-transmission of the next lower numbered digit has been measured off. If the next digit has not been recorded, then the next higher numbered TF relay is not operated. This holds back the operation of relay 1Y and the consequent counting by the outgoing counting relays, together with pulse transmission out over the trunk circuit after a digit is sent until the next digit is recorded, thus taking care of holding back the sending of a digit from the register-sender until the succeeding digit is recorded in the register sender. This is necessary to take care of parties who are slow in dialing the digits.

It will also be pointed out at this time that the pause between digits can be varied in time by changing the upper-most break contact from relay 1C3 to some other counting relay of the group. It will be recalled that the operation of relay 1C3 determines the inter-digit pause by causing the apparatus to take three steps without sending any pulses before the transmission of the next digit can be started. For example, if this contact is shifted from relay 1C3 to relay 1C2, then the pause between digits will be shorter, since only two steps are taken. If this contact is shifted to relay 1C4, then the pause will be longer because four steps will be taken to measure this inter-digit pause.

After the transmission of the fifth or station digit from the register-sender and the consequent operation of relays 1CHO and CHOP, which results in the operation of relay 6X, all as previously described, a circuit is closed for operating relay SW of the first selector extending from (+), make contact of relay 6X, conductor SW, make contact of relay RCI, brush SW and winding of relay SW to (—). Relay SW closes a locking circuit for itself extending from (+), make contact of relay SA, make contact and winding of relay SW to (—). Relay SW switches the incoming line circuit from the tip and ring conductors extending down to the register-sender to the windings of relay CB, which is effective to release relay CB of the register-sender (Fig. 8), this relay in turn effecting the release of relay SA. The release of relay SA effects the release of the counting relays of the incoming group which were left operated. Relays CHO, CRL and CRLP are likewise released.

The release of relay SA of the register-sender disconnects (+) from sleeve conductor SS leading up to the selector finder for effecting the release of relay RCI. The release of relay RCI closes a circuit for the selector finder release magnet extending from (+), lower winding of allotter relay 1AL, conductor 93, break contact of relay RCI, conductor 73, break contact of relay 1ALG, X off-normal contact XON and winding of magnet RM to (—). When the switch restores to normal, contact XON opens for de-energizing the release magnet winding. It will be noted that relay 1AL is energized in this circuit. This is for the purpose of maintaining this selector finder busy (in the event that relay 25AL is operated at this time) until the selector finder is completely restored to normal and the release magnet circuit, including the winding of relay 1AL is opened.

The release of relay SA of the register-sender also removes (+) from master ground conductors 1MG and 2MG, which is effective to release relay ON, and this relay in turn opens up and releases relays 1CHO, 2X, 2Y, 3X, 3Y, 4X, 4Y, 5X, 5Y and 6X. The release of relay ON also opens up the circuit of relay 1CB for releasing this relay, if operated at this time, and for preventing its operation until a succeeding call. The release of relay 1CB effects the release of relay 1SA. Relay 1CX will be momentarily operated during this clearing out portion of the cycle, but will be opened up and released by the release of relay 1CHO and its circuit will be maintained open by the release of relay SA. The release of relay ON discharges condenser CN through resistor R4 to prepare the condenser for the next cycle. It will be recalled that relay PO is to be positioned to the left at the beginning of a cycle. If the clearing out operation, above described, is effected with relay PO in its left-hand position, then there is no need to give it a preliminary swing to the left, as was explained at the beginning of the description.

It will now be explained how the switches of the switch train are operated in response to the impulses transmitted from the register-sender. It will be understood that these switches will be operated by the successive digits transmitted from the register-sender, but for convenience in describing the operation of the system, the complete register-sender operation was explained without reference to the resulting operations effected in response to the impulses transmitted over the trunk conductors leading to the switches. This portion of the operation will now be explained.

Remembering that relay SW of the first selector is not energized to transfer the calling line to the windings of relay CB of the first selector until after all of the digits have been transmitted from the register-sender, it will now be explained how these transmitted impulses function to control the operation of the selectors and connector. The three impulses of the first or thousands digit effect the release of relay CB, once for each impulse. During the release operations of relay CB the circuit to relay SA is opened, but this relay is not released because of its slow acting characteristics. At the first release of relay CB a circuit is closed for operating changeover relay CHO and the X magnet in series extending from (+) break contact of cut through relay CT, break contact of relay CB, make contact of relay SA, conductor 88, winding of relay CHO and winding of magnet XM to (—). This gives the XY switch one step in its X direction, closing a circuit for operating interrupter relay INT extending from (+), upper make contact of relay SA, conductor 89, make contact of relay CHO, X off-normal contact XON and winding of relay INT to (—). Relay INT closes a locking circuit for itself extending from (+), lower make contact of relay INT, conductor 71, break contact of relay CT, conductor 72, break contact of Y magnet YM, contact XON and winding of relay INT to (—). When relay CB is energized at the end of the first impulse, the above described circuit including windings of relay CHO and magnet XM is opened, effecting the release of magnet XM but relay CHO does not release because of its slow acting characteristics.

Each time relay CB is released, the above described circuit is completed for energizing relay CHO and magnet XM, thus stepping the switch in its X direction. In response to the three impulses, the switch is stepped to the third level and since relay CB now remains energized for a comparatively long interval, relay CHO is released. This closes a circuit for magnet YM extending from (+), upper make contact of relay SA, conductor 89, break contact of relay CHO, make contact of relay INT and magnet YM to (—). Magnet YM advances the XY switch one step in its secondary or Y direction and, at its break contact, opens up and releases relay INT. The release of relay INT opens up and releases magnet YM. This connects the brushes of the first selector to the first set of terminals in the selected level. If the first set of terminals, corresponding to the first trunk in this level, are associated with a busy trunk then a circuit is extended from (+) on the sleeve terminal of such busy trunk, brush S of the first selector, conductor 73, break contact of relay CT, conductor 72, break contact of magnet YM, off-normal contact XON and winding of relay INT to (—). This again operates relay INT for causing the switch to take another step in its Y direction, at which time the opening of the break contact of magnet YM again effects the release of relay INT, which in turn effects the release of magnet YM, thus preparing the first selector switch for another step if the second trunk is busy.

This explains how the first selector is caused to automatically step past busy trunks. During this busy trunk operation, relay CT has a connection to (+) on its right-hand terminal at the upper make contact of relay SA and also a connection to (+) on its left-hand terminal by way of brush S as well as by way of the lower make contact of relay INT for keeping the winding of relay CT short-circuited until an idle trunk is reached.

When the idle trunk is reached and relay INT is released, there being no connection to (+) on the terminal of brush S, relay CT is operated over a circuit extending from (+), upper make contact of relay SA, winding of relay CT, conductor 72, break contact of magnet YM, off-normal contact XON and winding of relay INT to (—). This operates relay CT in series with relay INT, but relay INT does not operate because of its low number of ampere turns and its marginal adjustment compared to the high resistance winding of relay CT.

The operation of relay CT extends conductors 1ST and 1SR to the winding of the CB relay (not shown) of the second selector for operating this relay, which in turn operates its associated SA relay, this latter relay extending a circuit from (+) back over brush S of the first selector for completing a locking circuit for relay CT before relay SA is released, by the release of relay CB, for opening the circuit to (+) at its upper make contact, which circuit operated relay CT. The operation of relay CT also disconnects its lefthand terminal from the contact of relay INT and from brush S to prevent a connection of this terminal to (+) which would short-circuit the winding of relay CT. Relay CT, at its lowermost break contact, opens up the circuit from (+) which would otherwise complete a circuit for relay CHO and magnet XM when relay CB releases and before the release of relay SA, thus preventing the operation of relay CHO and magnet XM when the circuits of the first selector are cut through to the second selector by the operation of relay CT.

The operation of the second selector, in response to the second digit transmitted from the register-sender, is the same as already described for the first selector and need not be repeated. After the transmission of the second digit, the connector is selected by the second selector and the closed circuit across the trunk line, including conductors 1ST and 1SR, effects the operation of relays CB and SA of the connector. Relay SA of the connector applies (+) to sleeve conductor CS extending back through the second selector and the first selector for holding the CT relays of these selectors and the SW relay of the first selector after it has been operated, as was previously explained. The operation of relay SA of the connector connects (+) to the stick 1 conductor for operating relay CX of the station selector relay group, by way of a circuit including break contacts in series of relays C4, C3, C2 and C1.

It will be recalled that the first digit transmitted to the connector (tens digit) was #1. This effects the release of relay CB for one impulse period and since this released condition of relay CB is of comparatively short duration, relay SA, because of its slow acting characteristics, is not released. The release of relay CB closes a circuit for operating changeover relay CHO and X magnet XM of the connector extending from (+), break contact of relay CB, make contact of relay SA, conductor 74, make contact of relay CX, conductor 75, and winding of relay CHO to (−). This circuit may likewise be traced from right-hand terminal of relay CHO and break contacts in series of relays TF and RI to X magnet XM. When relay CB is energized at the end of this impulse period, relay CHO and magnet XM are de-energized for stopping the connector switch at the first level and for releasing relay CHO. A circuit is now closed for operating transfer relay TF which extends from (+), make contact of relay CB, X off-normal contact XON, break contacts in series of relays CHO, RI and CI and winding of relay TF to (−). Relay TF closes a locking circuit for itself extending from (+), make contact of relay SA, break contact of relay RI, make contact and winding of relay TF to (−). When relay CB is released for transmitting the fourth or units digit, a circuit is closed for operating Y magnet YM and relay CHO. The circuit for operating magnet YM extends from (+), break contact of relay CB, make contact of relay SA, conductor 74, make contact of relay CX, conductor 75, make contact of relay TF and winding of magnet YM to (−). This circuit branches off to the winding of relay CHO for operating this relay. Relay CHO completes another locking circuit for relay TF, which is independent of that previously described and including a break contact of relay RI, this locking circuit extending from (+), make contact of relay SA, make contact of relay CHO, make contact and winding of relay TF to (−). This locking circuit is completed to prevent the release of relay TF when relay RI is operated at the first Y step of the connector switch over a circuit extending from (+), Y off-normal contact YON, make contact of relay TF, winding of relay RI, conductor 76 and resistor R30 to (−). Relay RI closes a locking circuit for itself extending from (+), make contact of relay SA, make contact of relay RI, winding of relay RI, conductor 76, and resistor R30 to (−).

When relay CB operates at the end of the impulse transmission, relay CHO and Y magnet YM are de-energized. The release of relay CHO opens up the above described locking circuit for relay TF for effecting the release of this latter relay.

Assuming the called line to be idle, a circuit is now closed for operating cut-in relay CI over a circuit extending from (+), make contact of relay CB, X off-normal contact XON, break contact of relay CHO, make contact of relay RI, break contact of relay TF, break contacts in series of relay BY and winding of relay CI to (−). Relay CI closes a locking circuit for itself extending from (+), make contact of relay CI, make contact of relay SA, break contact of relay BY and winding of relay CI to (−). This circuit from (+) may also be traced by way of a break contact of relay TF, conductor 77 to brush S and its associated contact for operating the cut-off relay of the called line and for making this line busy to other incoming calls.

In the event that the called line is busy, the release of relay CHO closes a circuit for operating busy relay BY before relay TF is released. This circuit may be traced from (+) on the terminal and brush S of the connector, conductor 77, make contact of relay TF, break contact of relay CHO, make contact of relay CB and winding of relay BY to (−). Relay BY closes a locking circuit for itself to maintain this relay operated until the release of the connection, which circuit extends from (+), make contact of relay SA, make contact and winding of relay BY to (−). Relay BY connects busy tone to the calling line and opens up the circuit to the revertive ringing tone source to prevent this source being applied to the calling line on a call to a busy called line. Relay BY also opens up the circuit to relay CI for preventing the operation of this relay on a call to a busy line. Relay BY also opens up the circuit to sleeve brush S to isolate this brush from the rest of the circuit until the connector is released from a call to a busy line.

In response to the single impulse of the fifth or station digit, transmitted in this example, relay CB releases for closing a circuit for operating relay CHO extending from (+), break contact of relay CB, make contact of relay SA, conductor 74, make contact of relay CX, conductor 75, and winding of relay CHO to (−). Since relay TF is released at this time and since relay RI is operated at this time, both the X and Y magnets are disconnected from the circuit to prevent their energization during the transmission of the station digit. The release of relay CB closes a circuit for locking relay CX extending from (+), break contact of relay CB, make contact of relay SA, conductor stick 2, make contact and winding of relay CX to (−). The release of relay CB also closes a circuit for operating counting relay C1 extending from (+), break contact of relay CB, make contact of relay SA, conductor 74, make contact of relay CX, conductor 75, break contact of relay TF, make contact of relay RI, make contact of relay CI, pick-up conductor, make contact of relay CX and winding of relay C1 to (−). The operation of relay C1 switches the stick 1 conductor, to which (+) is connected, from the winding of relay CX to the winding of relay C1 for locking this latter relay. Since this switch in the circuit happens well after the energization of conductor stick 2, relay CX is locked operated at this time.

When relay CB operates at the end of the station digit transmission, conductor stick 2 is de-energized for effecting the release of relay CX. At this time the circuit to relay CHO is likewise opened for effecting the release of this latter relay.

Ringing current of the selected frequency (in this example 33 cycles) is applied to the called line from the 33 cycle source, make contact of relay CI, winding of trip relay TR, conductor 78, break contact of relay CHO, make contact of relay RI, make contact of relay CI, conductor 79, tip brush T and tip conductor T of the called line, called substation, ring conductor R of the called line, terminal and ring brush R of the connector, conductor 69, make contact of relay CI and make contact of relay RI to ground.

During the ringing of the called station, revertive ringing tone is connected to the calling station over a circuit extending from the common revertive ringing tone source, break contact of relay CX, conductor 68, make contact of relay RI, break contact of relay BY and small tone condenser to the calling line. When the calling party answers, trip relay TR is operated for short-circuiting and releasing ringing relay RI, which in turn opens up the ringing circuit and releases relay TR. The release of relay RI disconnects the revertive ringing tone from the calling line. The release of relay RI also extends the called line circuit, by way of connector brushes T and R, to the windings of answering bridge relay AB, this relay operating over the called line circuit for reversing the battery back to the calling line. The calling and called lines are connected together in a conversational circuit by way of the talking condensers connected between the windings of relays CB and AB. When the conversation is terminated and the connection is cleared out by the calling party hanging up the receiver relay CB of the connector releases for releasing relay SA. Relay AB is released by the hanging up of the receiver at the called station or by the release of relay CI of the connector by the calling station.

The release of relay SA de-energizes and releases relays CI, CI, cut-off relay CO of the called line and closes a circuit for operating the release magnet RM of the connector extending from (+), break contacts in series of relays CB and SA, off-normal contact XON and winding of release magnet RM to (—). When the connector switch reaches normal the release magnet circuit is de-energized for restoring the connector equipment to its normal condition.

The release of relay SA of the connector disconnects (+) from sleeve conductor CS for in turn effecting the release of relays CT of the first and second selectors, as well as the release of relay SW of the first selector. The release of the CT relays of the first and second selectors closes obvious circuits for energizing the associated release magnets for releasing these switches. Since the sleeve conductor LFS leading back to the line finder is de-energized, relay FCI of this switch is released for energizing the line finder release magnet RM over a circuit extending from (+), upper winding of relay IAL, break contact of relay FCI, break contact of relay IALG, X off-normal contact XON and winding of magnet RM to (—). When this switch is restored to normal the release magnet circuit is opened for restoring the apparatus of the line finder to its normal condition.

This removal of (+) from conductor LFS likewise opens up the holding circuit for cut-off relay CO of the calling line and this relay is released.

It will now be explained how the register-sender functions in response to the dialing of only a single digit, for example 0 when long distance is desired. Referring to Figs. 7 and 8, the ten impulses transmitted by dialing 0 are effective to advance the incoming counting relays up to the point where relay CO is left operated. When relay CHO releases at the end of this digit a circuit is closed for operating long distance relay LD which may be traced from (+), make contact of relay SA, winding of relay CRL (previously operated in the manner previously explained), break contact of relay CHO, make contact of relay CRL, conductor 67, make contact of relay CO, conductor LD, of the last counting relay CO, conductor LD, break contact of relay ITF and winding of relay LD to (—). Relay LD closes a locking circuit for itself extending from (+), make contact of relay SA, make contact of relay CRLP, conductor TF, break contact of relay ITF, break contacts in multiple of relays 2X and 2TF, make contact and winding of relay LD to (—). This locking circuit for relay LD now completes a circuit from (+) on the right-hand terminal of relay LD, break contact of relay ITF, conductor LD, make contact of relay CO, conductor 67, make contact of relay CRL and break contact of relay CHO to the left-hand terminal of relay CRL. Since the right-hand terminal of this relay is connected to (+) at a make contact of relay SA, relay CRL is released for in turn effecting the release of relay CRLP. When relay CRLP is released relay ITF is operated over a circuit extending from (+) on master ground conductor IMG, winding of relay ITF and the above described locking circuit for relay LD to (—). The reason that relay ITF can operate at this time is that the release of relay CRLP opens up conductor TF which was previously connected to (+) for previously short-circuiting the winding of relay ITF.

The operation of relay ITF causes relay ON to be operated and causes the register-sender to start sending out this recorded digit over the trunk circuit leading to the automatic switches, all in the previously described manner. When the group of outgoing counting relays have been completely operated in sequence, the operation of relay ICII completes the above described correspondence circuit including channel conductor CHO extending by way of a make contact of relay LD and break contacts in series of relays IC, IB and IA, make contact of relay ITF, conductor II, break contacts of relays IC3 and CHOP in multiple and winding of relay ICHO to (—). Relay ICHO operates and effects the release of relays IX and IY, as previously described, for preventing the operation of relay ICB. Consequently, relay ISA is released for effecting the release of relay ICII, after which relay CHOP is operated and locked, for in turn operating relay 6X, all in the previously described manner except that this time the (+) on conductor 12 by way of the make contact of relay CHOP is extended by way of conductor 14 (instead of conductor 13) to the winding of relay 6X.

The operation of relay 6X operates relay SW of the first selector for clearing out the sender in the previously described manner. The upper make contact of relay LD is for the purpose of maintaining positive potential on the stick 1 conductor to prevent the release of counting relay CO of the incoming counting relay group, so that any subsequent operation of the dial will be ineffective. The remainder of the circuit operations effective in connection with the 0 call are the same as previously described, except in this instance of course, the first selector will be advanced to the 0 level for selecting a trunk to long distance.

Having described an automatic telephone system as particularly adaptable for use in a register-sender type system as one specific embodiment of the present invention, it is desired to be understood that the present form is selected to facilitate the disclosure of the invention rather than to limit the number of forms which it may assume and it is to be further understood that various modifications, adaptations and alterations may be applied to the specific form shown in order to meet the requirements of practice, without in any manner departing from the spirit or scope of the present invention except as limited by the appended claims.

What I claim is:

1. In a telephone system, a line finder, lines arranged in groups accessible to the wipers of said line finder, a start relay in said line finder having a plurality of windings, contacts on said start relay, means responsive to a call originating from a line in one of said groups for operating said start relay by energizing one of its windings, means responsive to the operation of said start relay for closing said contacts, means responsive to the closing of said contacts for automatically stepping the wipers of said line finder in a hunting movement, and means for releasing said start relay and opening said contacts in order to stop said hunting movement by energizing another of its windings.

2. In a telephone system, a line finder, lines arranged in groups accessible to the wipers of said line finder, a first start relay and a second start relay in said line finder each having a plurality of windings, means responsive to a call originating from a line in one of said groups for operating said first start relay by energizing one of its windings, means responsive to the operation of said first start relay for automatically stepping the wipers of said line finder in a primary hunting movement, means for releasing said first start relay to stop said primary hunting movement by energizing another of its windings, means responsive to the release of said first start relay for operating said second start relay by energizing one of its windings, means responsive to the operation of said second start relay for automatically stepping the wipers of said line finder in a secondary hunting movement, and means for releasing said second start relay to stop said secondary hunting movement by energizing another of its windings.

3. In an automatic telephone system, a group of lines, a group of finders having access to said lines, an all relay type allotter having a finder allotter relay for each of said finders for pre-selecting an idle one of said finders, means responsive to the initiation of a call on one of said lines for causing a finder allotter relay to operate for pre-selecting its associated finder, a differential relay in said finder, means controlled by the operation of said finder allotter relay for operating said differential relay, means controlled by the operation of said differential relay for initiating the operation of said pre-selected finder, and means for releasing said differential relay in response to the finding of said one of said lines to stop the operation of said pre-selected finder.

4. In a telephone system; a group of subscribers' lines; a group of finder switches having access to said lines, each switch including operating and release magnets; an allotter having access to said finders, said allotter including a start relay and a make busy relay for each finder; means controlled by the operation of a start relay for causing the associated finder to be advanced by its operating magnets into connection with a calling line of said group; means controlled by the energization of the release magnet circuit for operating the associated make busy relay; and circuit means for operating said start relay and energizing said release magnet circuit.

5. In a telephone system; a group of subscribers' lines; a group of finder switches having access to said lines, each switch including operating and release magnets; an allotter having access to said finders, said allotter including a start relay and a make busy relay for each finder; means controlled by the operation of a start relay for causing the associated finder to be advanced by its operating magnets into connection with a calling line of said groups; first means responsive to the connection of said finder with said calling line for operating the associated make busy relay; second means controlled by the energization of the release magnet circuit for operating the associated make busy relay; and circuit means for operating said start relay and energizing said release magnet circuit.

WINFRED T. POWELL.

References Cited in the file of this patent
UNITED STATES PATENTS

| Number | Name | Date |
|---|---|---|
| 1,747,169 | Hovland | Feb. 18, 1930 |
| 1,851,132 | Saunders | Mar. 29, 1932 |
| 1,914,391 | Wolf | June 20, 1933 |
| 2,344,653 | Staszak | Mar. 21, 1944 |